(12) United States Patent
Lipstone

(10) Patent No.: US 10,664,499 B2
(45) Date of Patent: *May 26, 2020

(54) CONTENT DELIVERY NETWORK ANALYTICS MANAGEMENT VIA EDGE STAGE COLLECTORS

(71) Applicant: LEVEL 3 COMMUNICATIONS, LLC, Broomfield, CO (US)

(72) Inventor: Laurence R. Lipstone, Calabasas, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/173,638

(22) Filed: Oct. 29, 2018

(65) Prior Publication Data

US 2019/0065574 A1    Feb. 28, 2019

Related U.S. Application Data

(63) Continuation of application No. 14/475,366, filed on Sep. 2, 2014, now Pat. No. 10,114,882, which is a
(Continued)

(51) Int. Cl.
G06F 16/28     (2019.01)
G06F 16/9535   (2019.01)
(Continued)

(52) U.S. Cl.
CPC ...... *G06F 16/283* (2019.01); *G06F 16/24556* (2019.01); *G06F 16/437* (2019.01);
(Continued)

(58) Field of Classification Search
CPC .. G06F 16/283; G06F 16/437; G06F 16/9535; G06F 16/24556; H04L 65/4084; H04L 67/10; H04L 67/22; H04N 21/24
See application file for complete search history.

(56) References Cited

U.S. PATENT DOCUMENTS 7,007,089 B2   2/2006  Freedman
7,027,951 B1   4/2006  MacCormick et al.
(Continued)

FOREIGN PATENT DOCUMENTS

WO   WO-2009117288     9/2009

OTHER PUBLICATIONS

U.S. Appl. No. 14/475,366, Decision on Appeal, PTAB Appeal No. 2018-001976, mailed Aug. 23, 2018, 6 pages. (Year: 2018).*
(Continued)

*Primary Examiner* — Scott A. Waldron

(57) ABSTRACT

Example embodiments herein include a system having one or more edge servers disposed in an edge site of a content delivery network (CDN). The system can include a collector for collecting analytics associated with requests for content in the CDN. One or more additional collectors can be instantiated in the system, for example, in response to an increase in recordable events detected in the CDN. The system can include an aggregator for aggregating the collected analytics with analytics collected from other edge stages of the CDN. The system can also include a data store that stores the aggregated analytics according to a configurable data model.

20 Claims, 16 Drawing Sheets

Related U.S. Application Data continuation of application No. 13/402,752, filed on Feb. 22, 2012, now Pat. No. 8,825,608.

(60) Provisional application No. 61/445,973, filed on Feb. 23, 2011.

(51) Int. Cl.
  | | |
  |---|---|
  | *H04L 29/08* | (2006.01) |
  | *H04N 21/24* | (2011.01) |
  | *G06F 16/435* | (2019.01) |
  | *G06F 16/2455* | (2019.01) |
  | *H04L 29/06* | (2006.01) |

(52) U.S. Cl.
  CPC ...... *G06F 16/9535* (2019.01); *H04L 65/4084* (2013.01); *H04L 67/10* (2013.01); *H04L 67/22* (2013.01); *H04N 21/24* (2013.01)

(56) References Cited

U.S. PATENT DOCUMENTS

| | | | |
|---|---|---|---|
| 7,274,658 B2 | 9/2007 | Bornstein et al. | |
| 7,359,955 B2 | 4/2008 | Menon et al. | |
| 7,962,580 B2 | 6/2011 | Gagliardi et al. | |
| 8,255,489 B2 * | 8/2012 | Afergan | H04L 67/02 709/206 |
| 8,825,608 B2 | 9/2014 | Lipstone | |
| 2003/0065762 A1 | 4/2003 | Stolorz et al. | |
| 2003/0236745 A1 * | 12/2003 | Hartsell | G06Q 20/102 705/40 |
| 2008/0028436 A1 | 1/2008 | Hannel et al. | |
| 2008/0034393 A1 | 2/2008 | Crayford | |
| 2008/0228920 A1 | 9/2008 | Souders et al. | |
| 2009/0254661 A1 | 10/2009 | Fullagar et al. | |
| 2010/0228819 A1 | 9/2010 | Wei | |
| 2011/0055386 A1 * | 3/2011 | Middleton | H04L 67/125 709/224 |
| 2011/0213879 A1 | 9/2011 | King et al. | |
| 2012/0198050 A1 | 8/2012 | Maki et al. | |
| 2012/0215779 A1 | 8/2012 | Lipstone | |
| 2015/0161226 A1 | 6/2015 | Lipstone | |

OTHER PUBLICATIONS

"Autonomous Systems & Autonomous System Numbers", *American Registry for Internet Numbers*, 2 pgs.

Canadian Examination Report, dated Dec. 13, 2017, Application No. 2,827,572, filed Feb. 22, 2012; 3 pgs.

Extended European Search Report, dated Jul. 27, 2016, Application No. 12749205.6, filed Feb. 22, 2012; 8 pgs.

International Preliminary Report on Patentability, dated Aug. 27, 2013, Int'l Application No. PCT/US12/026140, Int'l Filing Dated Feb. 22, 12; 7 pgs.

International Search Report, dated May 29, 2012, PCT/US12/026140, Intl Filing Date Feb. 22, 2012, 3 pgs.

Written Opinion, dated May 29, 2012, PCT/US12/026140, Intl Filing Date Feb. 22, 2012, 5 pgs.

Nygren, E et al., "The Akamai Network: A Platform for High-Performance Internet Applications", ACM SIGOPS Operating Systems Review Jul. 1, 2010, pp. 2-19.

Repantis, T. et al., "Scaling a Monitoring Infrastructure for the Akamai Network", ACM SIGOPS Operating Systems Review Jul. 1, 2010, pp. 20-26.

\* cited by examiner

US 10,664,499 B2

CONTENT DELIVERY NETWORK ANALYTICS MANAGEMENT VIA EDGE STAGE COLLECTORS

TECHNICAL FIELD

Embodiments presently disclosed relate to content and network analytics management. More specifically, embodiments presently disclosed relate to content and network analytics management in a content delivery network.

BACKGROUND

Internet use has grown tremendously in recent years. The types and sources of content on the Internet have also grown. For example, computer users often access the Internet to download video, audio, multimedia, or other types of content for business, entertainment, education, or other purposes. Today, users can view live presentations of events, such as sporting events, as well as stored content, such as videos and pictures. The providers of such content typically want to have some level of control over the manner in which the content is viewed and by whom. For example, the provider of videos may want certain videos (e.g., selected videos, or type or class of videos) to be encrypted upon distribution. Users typically want content "on-demand", and would prefer not to wait a long time for download before viewing the content. Certain types of content tend to take longer than others to download. For example, download of a movie can take many minutes or hours, depending on the type of download technology used and the size of the movie file.

Typically, providers of Internet content are separate entities from the network providers that provide the infrastructure to distribute the content. To reach a very large audience, content providers typically purchase the services of a content delivery network provider, which generally has a large network infrastructure for distributing the content. However, because content providers typically do not have control over distribution, the providers typically have limited control over how, or to whom, the content is distributed. In addition, content providers do not have access to internal content and network analytics within the content delivery networks.

SUMMARY

Content and network analytics data can be collected by a content delivery network and provide information about access to resources in caching services. In one embodiment, for example, such content and network analytics data can be collected at a fine level of granularity and at a large scale.

Content to be delivered via a content delivery network can be identified (e.g., using URL patterns, tags, tokens, or the likes) so that content and network analytics can be monitored for that content within a content delivery network. A data model is provided for identifying content data into collections.

A scalable content and network analytics collection system for a content delivery network is provided. In one embodiment, for example, each one of a plurality of collectors correspond to a plurality of edge servers that deliver content for a content delivery network. Each collector obtains data for content delivered via the plurality of corresponding edge servers and applies collection rules to the data. An aggregator processes data from the plurality of edge collectors in parallel to provide content and/or network analytics for content delivered by the content delivery network.

Other implementations are also described and recited herein.

BRIEF DESCRIPTIONS OF THE DRAWINGS

DETAILED DESCRIPTION

Embodiments presently disclosed relate to content and/or network analytics management. More specifically, embodiments presently disclosed relate to content and/or network analytics management in a content delivery network.

Figure 1:
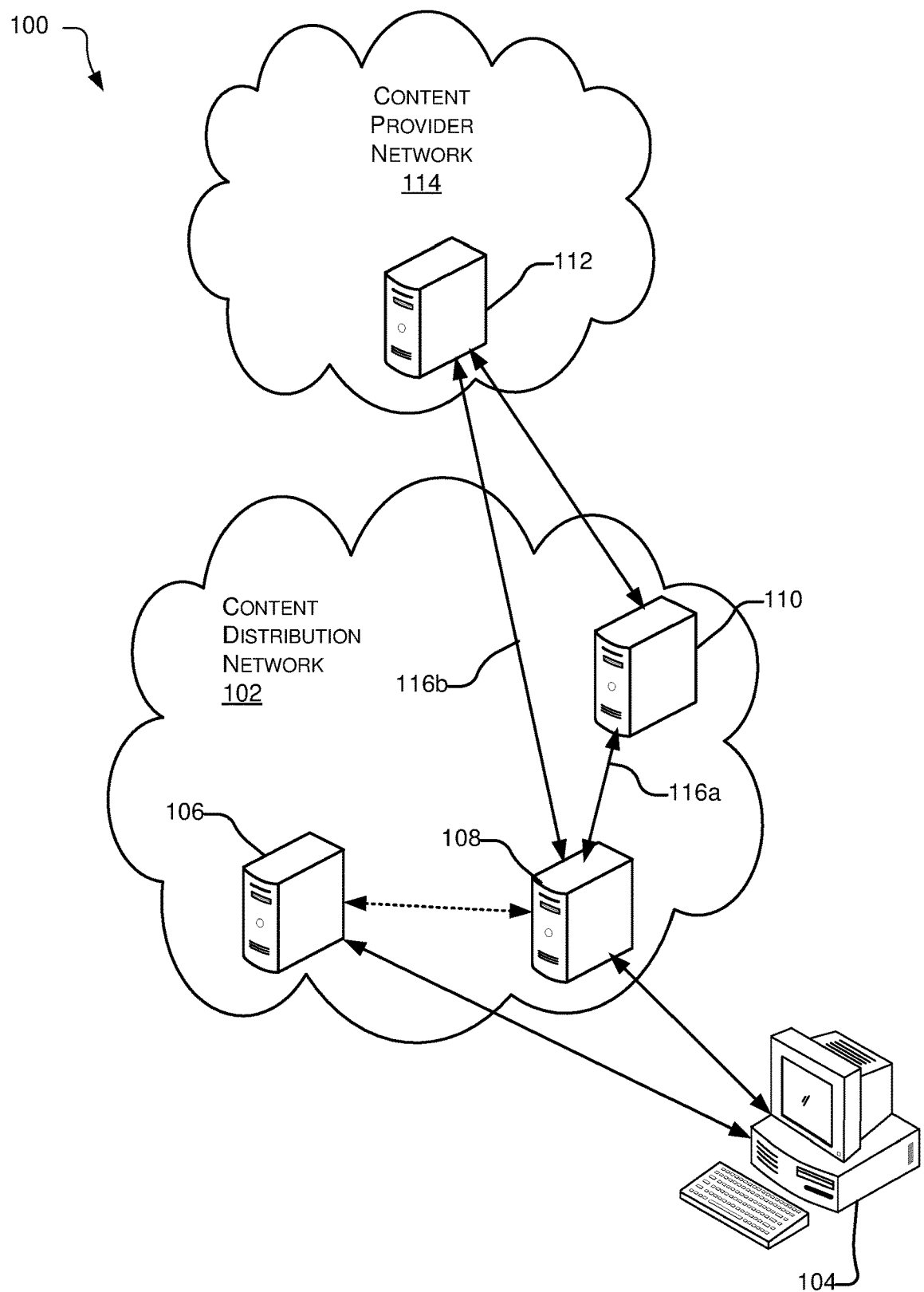
FIG. 1 illustrates an example network environment suitable for distributing content and monitoring analytics according to various embodiments.

FIG. 1 illustrates an example network environment 100 suitable for distributing content and monitoring and/or analyzing content and/or network analytics according to various embodiments. A computer user may access a content distribution network (CDN) 102 using a computing device, such as a desktop computer 104. The CDN 102 is illustrated as a single network for ease of illustration, but in actual operation as described in more detail below, CDN 102 may typically include (or be implemented across), at least in part, one or more networks.

For example, network 102 may represent one or more of a service provider network, a wholesale provider network and an intermediate network. The user computer 102 is illustrated as a desktop computer, but the user may use any of numerous different types of computing devices to access the network 102, including, but not limited to, a laptop computer, a handheld computer, a personal digital assistant (PDA), a smart phone, a cell phone, etc.

The network 102 may be capable of providing content to the computer 104 and monitoring and/or analyzing content and/or network analytics for the network environment 100. Content may be any of numerous types of content, including video, audio, images, text, multimedia, or any other type of media. The computer 104 includes an application to receive, process and present content that is downloaded to the computer 104. For example, the computer 104 may include an Internet browser application, such as Internet Explorer™ or Firefox™, and a streaming media player, such as Flash Media Player™ or Quicktime™. When the user of computer 104 requests a particular content item (e.g., selects a link or hyperlink), the user's computer 104 causes a request to be sent to a directory server 106 (e.g., DNS server) requesting that the directory server provide a network address (e.g., uniform resource locator 'URL', Internet protocol (IP) address, etc.) indicating where the requested content can be obtained.

In some embodiments, directory server 106 is a domain name system (DNS), which resolves an alphanumeric domain name to an IP address. Directory server 106 resolves the link name (e.g., URL) to an associated network address and then notifies the computer 104 of the network address from which the computer 104 can retrieve the selected content item. When the computer 104 receives the network address, the computer 104 then sends a request for the selected content item to a computer, such as streaming server computer 108, associated with the network address supplied by the directory server 106. An example embodiment includes a tiered directory server approach wherein one or more directory servers 106 (e.g., DNS servers) reside at two or more tiers (e.g., an ISP tier, a CDN tier, etc.) of one or more interconnected networks.

In the particular embodiment illustrated, streaming server computer 108 is an edge server of the CDN 102. Edge server computer 108 may be more or less strategically placed within the network 102 to achieve one or more performance objectives such as, for example, reducing load on interconnecting networks, freeing up capacity, providing scalability, increasing speed and quality of content delivery, lowering delivery costs, and so on. The edge server 108, for example, may cache content that originates from another server, so that the cached content is available in a more geographically or logically proximate location to the end user. Such strategic placement of the edge server 108 could reduce content download time to the user computer 104.

Edge server computer 108 is configured to provide requested content to a requester. As used herein, the term "requester" can include any type of entity that could potentially request content, whether the requester is the end user computer or some intermediate device. As such, a requester could be the user computer 104, but could also be another computer, or a router, gateway or switch (not shown) requesting the content from the edge server computer 108. As will be understood, requests generated by the computer 104 are typically routed over one or more "hops" between routers or other devices to the edge server computer 108. Accordingly, a requester of content could be any of numerous devices communicably coupled to the edge server computer 108.

As part of the function of providing requested content, the edge server computer 108 is configured to determine whether the requested content is available locally from the edge server computer 108 to be provided to the requester. In one embodiment, the requested content is available if the content is stored locally in cache and is not stale. In one particular implementation, stale is a condition in which the content is older than a prescribed amount of time, typically designated by a "time-to-live" value, although other measures may also be used. The edge computer server 108 may be configured with media streaming server software, such as Flash Media Server™ (FMS) or Windows Media Server™ (WMS). As such, if the requested content is found to be locally stored on the edge computer server 108 and the cached content is not stale, the edge server 108 can deliver (e.g., stream) the requested content to the requester, in this case, the computer 104.

If the edge server computer 108 determines that requested content is not available (e.g., is either not locally stored or is stale), the edge server computer 108 takes a remedial action to accommodate the request. If the content is locally stored but is stale, the remedial action involves attempting to revalidate the content. If the content is not locally stored or revalidation fails (in the case of stale content), the edge server computer 108 attempts to retrieve the requested content from another source, such as a media access server or some other upstream server. A media access server (MAS) is a server computer that may be able to provide the requested content.

In the illustrated embodiment, two possible media access servers are shown: a content distribution server computer 110 and a content origin server 112. Content origin server 112 is a server computer of a content provider. The content provider may be a customer of a content distribution service provider that operates the network 102. The origin server 112 may reside in a content provider network 114, a CDN network, or any other network and/or storage paradigm.

In some embodiments, the content origin server 112 is an HTTP server that supports virtual hosting. In this manner, the content server can be configured to host multiple domains for various media and content resources. During an example operation, an HTTP HOST header can be sent to the origin server 112 as part of an HTTP GET request. The HOST header can specify a particular domain hosted by the origin server 112, wherein the particular domain corresponds with a host of the requested content.

The content distribution server 110 is typically a server computer within the content distribution network 102. The content distribution server 110 may reside logically in between the content origin server 112, in the sense that content may be delivered to the content distribution server 110 and then to the edge server computer 108. The content distribution server 110 may also employ content caching.

In some embodiments, the edge server computer 108 locates the media access server by requesting a network address from the directory server 106, or another device operable to determine a network address of a media access server that is capable of providing the content. The edge server computer 108 then sends a request for content to the located media access server. Regardless of which media access server is contacted, the media access server can respond to a request for specified content in several possible ways. The manner of response can depend on the type of request as well as the content associated with the request.

For example, the media access server could provide information to the edge computer server 108 that indicates that the locally cached version of the content on the edge computer server 108 is either stale or not stale. Alternatively, the media access server could send the specified content to the edge computer server 108 if the media access server has a non-stale copy of the specified content. In one embodiment, the media access server includes data transport server software, such as, for example, a Hypertext Transport Protocol (HTTP) server. In this case, the edge server computer 108 interacts with the media access server using the data transport protocol employed by the media access server.

With further regard to the communications between the edge server computer 108 and the media access server computer (e.g., either the content origin server 112 or the content distribution server 110), the two servers may communicate over a channel. These channels are illustrated as channel 116a between the edge server computer 108 and the content distribution server 110 and channel 116b between the edge server computer 108 and the content origin server 112. According to various embodiments described herein, channels 116 are data transport, meaning the channels 116 carry data using a data transport protocol, such as HTTP.

In one embodiment, edge server 108 may be configured to retrieve content using a data transport protocol while simultaneously delivering (e.g., streaming) content to the content requester. For example, the edge server computer 108 is operable to simultaneously stream requested content to the requester (e.g., the computer 104) while receiving the content from the origin server computer 112 over the data transport protocol channel 116b. Operations carried out by the edge server computer 108 and modules employed by the edge server computer 108 can perform simultaneous content delivery and retrieval.

In yet another example embodiment, content and/or network analytics are monitored and analyzed within the network environment 100, such as within the content distribution network 102, such as described in more detail below with respect to FIGS. 8-15.

Figure 2:
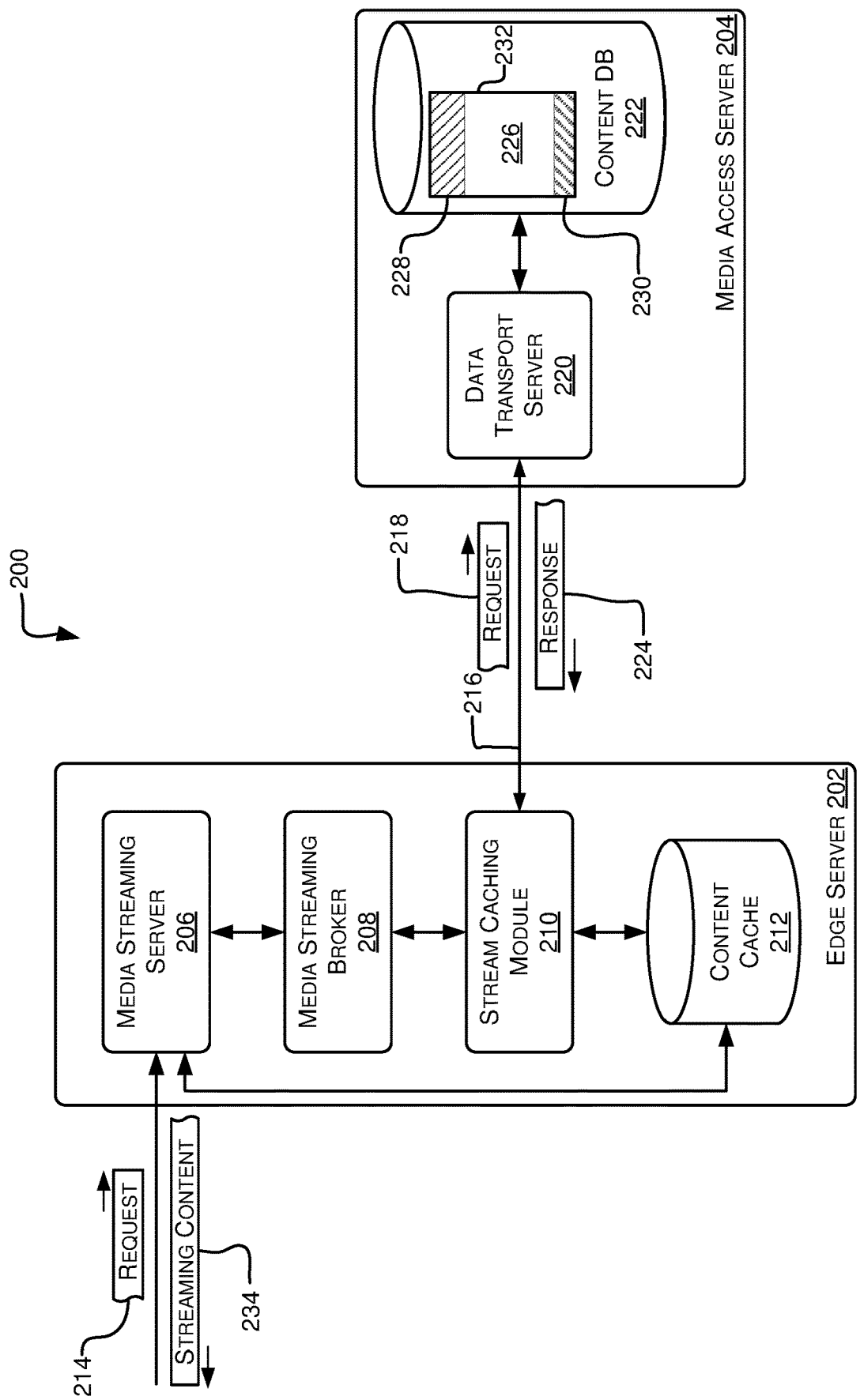
FIG. 2 illustrates a system in terms of functional modules for distributing content and monitoring analytics according to various embodiments.

FIG. 2 illustrates a streaming content delivery framework 200 adapted to monitor and/or analyze content and/or network analytics including an edge server computer 202 and a media access server (MAS) computer 204. Edge server computer 202 is configured with modules operable to retrieve content from the MAS 204, if necessary, while streaming the content to an entity that has requested the content. In some embodiments, retrieval of requested content from the MAS 204 is simultaneous with streaming of the content to the requester.

In the embodiment illustrated in FIG. 2, the edge server computer 202 includes a media streaming server 206, a media streaming broker 208, a stream caching module 210 and a content cache 212. In an illustrative scenario, a content request 214 is received from a requester. The content request has various information, including, but not limited to, an identifier of the content being requested. An identifier, for example, may include a URL, token, tag, or other identifier. The request 214 may identify a particular portion of the content being requested.

In one embodiment, a content provider tags content or other information. The content provider in an embodiment, for example, classifies or identifies a request, a requesting client, or requested content for analysis within the content delivery network and/or the analytics engine. Examples of tags include URL tags (e.g., via naming conventions or query strings), tags in HTTP headers, or other types of tags. In one implementation, the tag or identifier is used to provide the content delivery network with the ability to aggregate aspects of multiple requests across a given session for.

The request 214 is initially received by the media streaming server. The media streaming server 206 could be a Flash Media Server™ (FMS), Windows Media Server™ (WMS), or other streaming media service. The media streaming server 206 is configured to communicate data with a content requester using a data streaming protocol (e.g., Real Time Messaging Protocol (RTMP)) in response to content requests. Upon receipt of request 214, the media streaming server 206 passes the request 214 to the media streaming broker 208 and waits for a response from the broker 208. As such, the media streaming broker 208 maintains the state of the media streaming server 206.

The media streaming broker 208 is operable to serve as a go-between for the media streaming server 206 and the stream caching module 210. As such, the media streaming broker 208 facilitates communications between the media streaming server 206 and the stream caching module 210 to thereby support streaming of content. In one embodiment, the media streaming broker 208 is a software plug-in that uses application programming interfaces (APIs) of the media streaming server 206 to communicate with the media streaming server 206. The media streaming broker 208 is operable to handle requests from the media streaming server 206, maintain some state of the media streaming server 206, and notify the media streaming server when content is in the cache 212. When the media streaming broker 208 receives a content request, the broker 208 generates a content request to the stream caching module 210.

The stream caching module (SCM) 210 includes functionality for responding to content requests from the broker 208. In one embodiment, shown in FIG. 3, discussed in conjunction with FIG. 2, the SCM 210 includes a streaming request handler 302, a cache manager 304 and a data transport interface 306. The streaming request handler 302 receives the request from the broker 208 and queries the cache manager 304 whether the requested content is in the cache 212. The cache manager 304 determines if the requested content exists in the cache 212.

If the requested content is in the cache 212, the cache manager 304 of the SCM 210 checks the age of the content to determine if the content is stale. Generally, each content item has an associated time-to-live (TTL) value. The cache manager 304 notifies the request handler 302 of the results of the checks on the requested content; i.e., whether the content exists, and if so, whether the content is stale.

If the content exists in the cache 212 and is not stale, the request handler 302 notifies the media streaming server 206 via the media streaming broker that the content is ready to be streamed and provides a location in the cache 212 from which the content can be read. If the content is not in the cache 212, or the content is stale, the request handler 302 notifies the data transport interface 306. The data transport interface 306 is configured to communicate over a data transport channel, such as an HTTP channel 216, to the MAS 204.

The data transport interface 306 transmits a request 218 to the MAS 204 identifying the requested content. The request 218 may be one of several different types of requests, depending on the situation. For example, if it was determined that the requested content was in the cache 212, but the content was stale, the data transport interface 306 transmits a HEAD request (in the case of HTTP) to the MAS 204 indicating that the current state of the requested content in the local cache is stale. If the requested content is not in the cache 212, the data transport interface 306 transmits a GET (in the case of HTTP) request to the MAS 204 to retrieve at least a portion of the content from the MAS 204. The MAS 204 includes a data transport server 220, which receives and processes the request 218.

The data transport server 220 is configured to communicate via a data transport protocol, such as HTTP, over the data transport channel 216. Initially, the data transport server 220 determines if the content identified in the request 218 is in a content database 222 accessible to the MAS 204. The data transport server 220 queries the content database 222 for the requested content. Based on the response of the content database 222, the data transport server 220 generates a response 224, the contents of which depend on whether the requested content is in the database 222.

The response 224 generally includes a validity indicator, which indicates that the request 218 was or was not successfully received, understood and accepted. If the data transport protocol is HTTP, the response 224 indicator is a numerical code. If the requested content is not in the database 222, the code indicates invalidity, such as an HTTP 404 code, indicating the content was not found in the database 222.

If the requested content, for example file 226, is found in the database 222, the response 224 code will be a valid indicator, such as HTTP 2XX, where "X" can take on different values according to the HTTP definition. If the request 218 to the MAS 204 is a HEAD request, and the content is found in the database 222, the response 224 typically includes an HTTP 200 code. The response 224 to a HEAD request also includes information indicating whether the TTL of the content in cache 212 is revalidated or not. In the case of a GET request, and the requested content, e.g., file 226, is found in the database 222, the response 224 includes an HTTP code, along with a portion of the content 226.

The data transport interface 306 of the stream cache module 210 receives the response 224 and determines the appropriate action to take. In general, the data transport interface 306 notifies the streaming request handler 302 as to whether the content was found by the MAS 204 or not. If the content was not found by the MAS 204, and, assuming the cache manager 304 did not find the content in cache 212, the streaming request handler 302 notifies the media streaming server 206 via the media streaming broker 208 that the requested content is not found.

If the response 224 is a valid response to a HEAD request, the response 224 will indicate whether the TTL of stale content in cache 212 has been revalidated. If the TTL is revalidated, the cache manager 304 updates the TTL of the validated content and notifies the streaming request handler 302 that the content is available in cache 212 and is not stale. If the response 224 indicates that the stale content in cache 212 is not revalidated, the cache manager 304 deletes the stale content and indicates that the content is not in cache 212. The streaming request handler 302 then requests the content from the data transport interface 306.

A GET request can specify a portion of the content to be retrieved and if the GET request is valid, the response 224 will generally include the specified portion of the identified content. The request 218 can be a partial file request, or a range request, which specifies a range of data in the file 226 to be sent by the data transport server 220. The range may be specified by a beginning location and an amount; e.g., a byte count. Range requests are particularly useful for certain types of content and in response to certain requests, or other situations.

For example, if the requested file 226 is a Flash™ file, the first one or more GET requests will specify the portion(s) of the file 226 that are needed for the media streaming server 206 to immediately start streaming the file 226 to the requester. The entire file 226 is not required in order for the media streaming server 206 to start streaming the file 226 to the requester. In some cases, a particular portion of the content includes metadata about the content that enables the media streaming server 206 needs to start the streaming. Metadata may include file size, file format, frame count, frame size, file type or other information.

It has been found that for a Flash™ file, such as file 226, only a head portion 228 of the file 226 and a tail portion 230 of the file 226 are initially needed to start streaming the file 226 because the head 228 and the tail 230 include metadata describing the file 226. The remainder 232 of the file 226 can be obtained later. In one embodiment, the head portion 228 is the first 2 megabytes (MB) and the tail portion 230 is last 1 MB of the file 226, although these particular byte ranges may vary depending on various factors.

In the case of Flash™ file 226, after the head portion 228 and tail portion 230 of file 226 have been received by the data transport interface 306, the data transport interface 306 stores those portions in the cache 212, and the streaming request handler 302 is notified that the initial portions of the requested content are available in cache 212. The request handler 302 then notifies the streaming media server 206 of the location of the initial portions of the content in the cache 212. The streaming media server 206 then begins reading content from the cache 212 and sending streaming content 234 to the requester.

While the media streaming server 206 is streaming content to the requester, the SCM 210 continues to retrieve content of the file 226 from the MAS 204 until the remainder 232 is retrieved. The data transport interface 306 of the SCM 210 sends one or more additional GET requests to the data transport server 220 of the MAS 204, specifying range(s) of content to retrieve. In some embodiments, the data transport interface 306 requests sequential portions of the file 226 in set byte sizes, such as 2 MB or 5 MB at a time until the entire file 226 has been retrieved. The amount requested with each request can be adjusted depending on various parameters, including real time parameters, such as the latency of communications to and from the MAS 204.

During streaming of the requested content, the requester may issue a location-specific request requesting that data be streamed from a particular specified location within the content. The specified location may or may not yet be stored in the content cache 212. Such a location-specific request is received by the streaming media server 206 and passed to the media streaming broker 208. The streaming media broker 208 sends a request to the request handler 302 of the SCM 210. The request handler 302 requests that the cache manager 304 provide data from the specified location. The cache manager 304 attempts to retrieve data at the specified location in the file from the cache 212.

If the specified location is not yet in the cache 212, the cache manager 304 notifies the request handler 302. The request handler 302 then requests that the data transport interface 306 retrieve content at the specified location. In response, the data transport interface 306 sends a GET request specifying a range of data starting at the specified location, regardless of whether and where the data transport interface 306 was in the midst of downloading the file 226.

For example, if the location specified by the requester is at the end of the file 226, and the data transport interface 306 is in the process of sequentially downloading the file 226 and is at the beginning of the file 226, the data transport interface 306 interrupts its sequential download and sends a range request for data starting at the specified location. After content is retrieved from the specified location the data transport interface 306 resumes its sequential download from where it left off prior to receiving the location-specific request.

Figure 3:
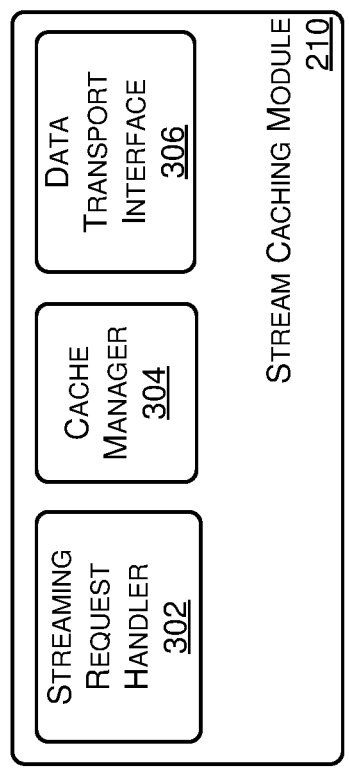
FIG. 3 is a functional module diagram illustrating one possible implementation of a streaming cache module according to various embodiments.

The components of the edge server 202, the MAS 204 and the stream cache module of FIG. 3 may be combined or reorganized in any fashion, depending on the particular implementation. For example, the data stores (e.g., content cache 212 and content database 222) may be separate from their associated servers. The data stores may be any type of memory or storage and may employ any type of content storage method. The data stores, such as content cache 212 and database 222, may include database server software, which enables interaction with the data stores.

Figure 4:
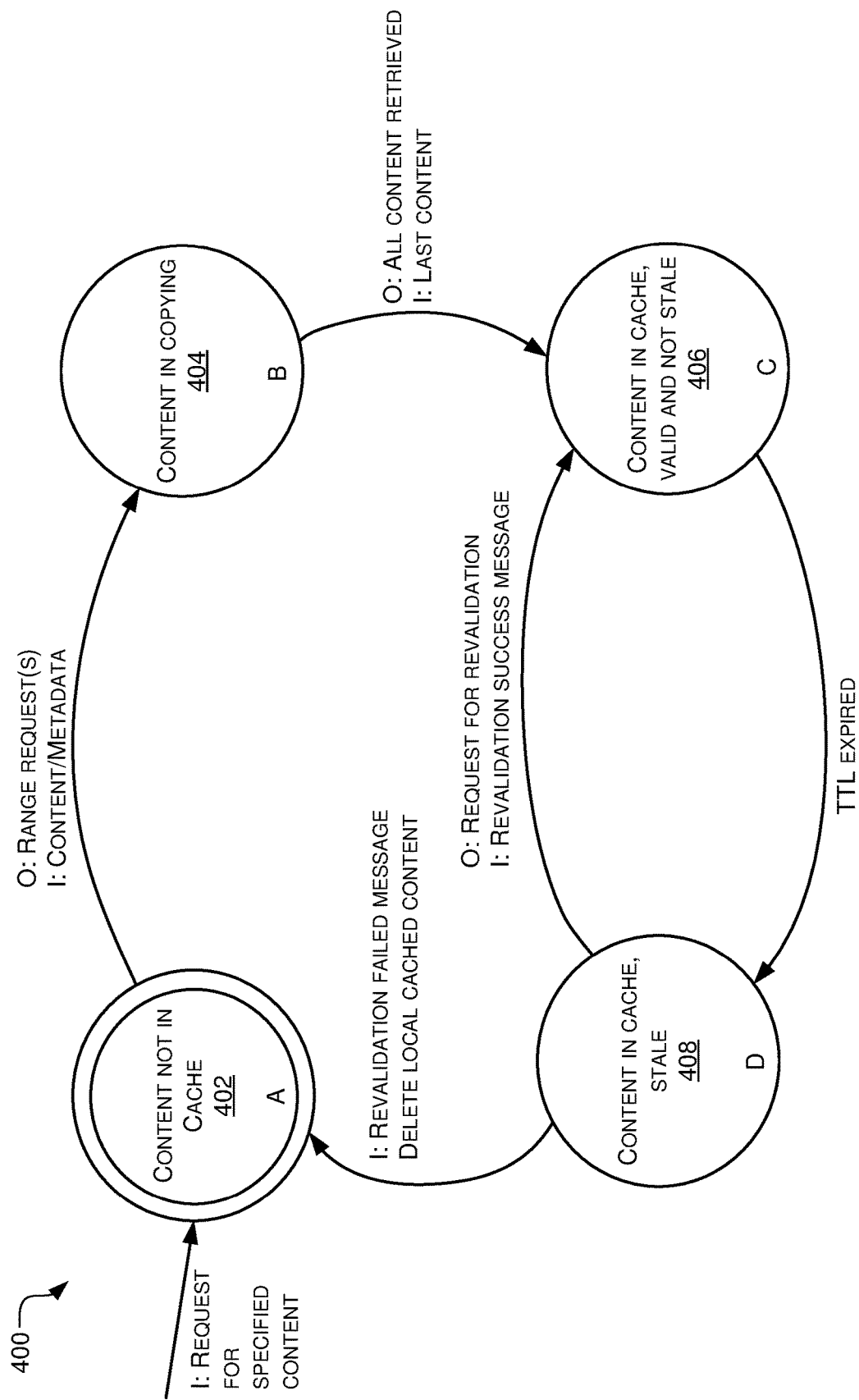
FIG. 4 is a state diagram illustrating one possible set of states that a streaming cache module can enter according to various embodiments.

FIG. 4 is a state diagram 400 illustrating states that a streaming cache module, such as stream caching module 210 (FIG. 2), or similar component, may enter, and conditions that cause entry into and exit from those states. Initially, in this example scenario, the SCM 210 may enter state A 402 when the SCM 210 receives a request for specified content. It will be understood that the SCM 210 may enter another state initially, but for purposes of illustration, it is assumed here that the content specified in the request is not in local cache. In state A 402, the SCM determines that the specified content is not in the local cache. Upon determining that the specified content is not in the local cache, the SCM enters state B 404.

Upon entry into state B 404, the SCM outputs one or more range requests to a media access server and begins receiving content and/or metadata from the media access server (MAS). It is assumed in this case that the MAS has, or can obtain, a non-stale copy of the requested file.

With regard to range requests generated by the SCM 210, each of the one or more range requests specifies a beginning location of data and a range of data to be retrieved. The range request is a type of request supported by a data transport protocol, such as HTTP, and is recognized by the MAS, which includes a data transport server, such as an HTTP or web server. Thus, the MAS is able to read the range request(s) and respond with portions of the requested content identified in the range request(s).

An initial range request may specify a location in the file that includes metadata about the file that enables the streaming media server to promptly begin streaming the requested content. Such metadata can include control data or definitions that are used by the streaming media server to stream the content.

For example, in the case of a Flash™ file, the initial range request may specify the head of the Flash™ file, which gives information about the layout of the file, such as entire file size, frame size, total number of frames, and so on. In the case of Flash™ files, the initial range request, or one of the first range requests typically also specifies an end portion of the file because the end portion includes information used by the streaming media server to begin streaming the content of the file. For example, in some embodiments, the SCM generates a range request for the first two megabytes of a specified Flash™ file and the last one MB of the Flash™ file.

In state B 404, the SCM continues to request and receive content data until the entire file is retrieved. The content may be retrieved in sequential order from beginning to end of the content file, or the content may be retrieved in some other order. Out of sequential order retrieval may occur in response to a location-specific request from a user viewing the content to move to another specified location in the file. For example, the user may advance (or "rewind") to a particular place in the streaming content file through the user's streaming media player.

When the user moves to a particular location in the streaming file, a request is sent to the SCM specifying the particular location in the file to move to. In response, in state B 404, the SCM generates a range request specifying the requested place in the file. The SCM may also notify the streaming media server (e.g., via the media streaming broker 208) when a portion or portions of the content have been stored in local cache, so that the streaming media server can begin streaming those portion(s).

After the requested content file is completely downloaded, the SCM may generate an output indicating the file is downloaded. The SCM then enters state C 406. In state C 406, the SCM waits until the content becomes stale. In state C 406, the SCM checks the age of the content file and compares the age to a specified "time-to-live" (TTL) value, which may be provided in a message from the MAS. When the content file becomes stale, the SCM enters state D 408.

In state D 408, the SCM sends a request to the MAS to revalidate the content file. The MAS may send a message indicating successful revalidation and a new TTL value. If so, the SCM returns to state C 406, where the SCM again waits until the TTL expires. On the other hand, while in state D 408, if the MAS does not revalidate the content, or generates a message indicating a revalidation failure, the SCM returns to state A 402. Before entering state A from state D, the SCM deletes the stale content.

With further regard to the revalidation of content, one embodiment involves the use of HTTP headers. In this embodiment the SCM sends a HEAD request and will expect one of the HTTP headers: Cache-Control or Expires. Those headers provide TTL information. After a given content file is fully downloaded, the SCM checks the TTL of the given content file in response to each incoming request for the file. If the content file ages past the TTL, then the SCM will send another HEAD request to revalidate the content. The response will depend on the media access server. For example, the Apache HTTP Server responds with a "200" response. Upon receipt of the "200" response SCM checks both the modifying time and the file size to make sure the cache content is still valid. As another example, the Microsoft's IIS™ HTTP server responds to a HEAD request with a "200" if the content is modified and stale, or "304" (not modified) if the content is still valid.

Figure 5:
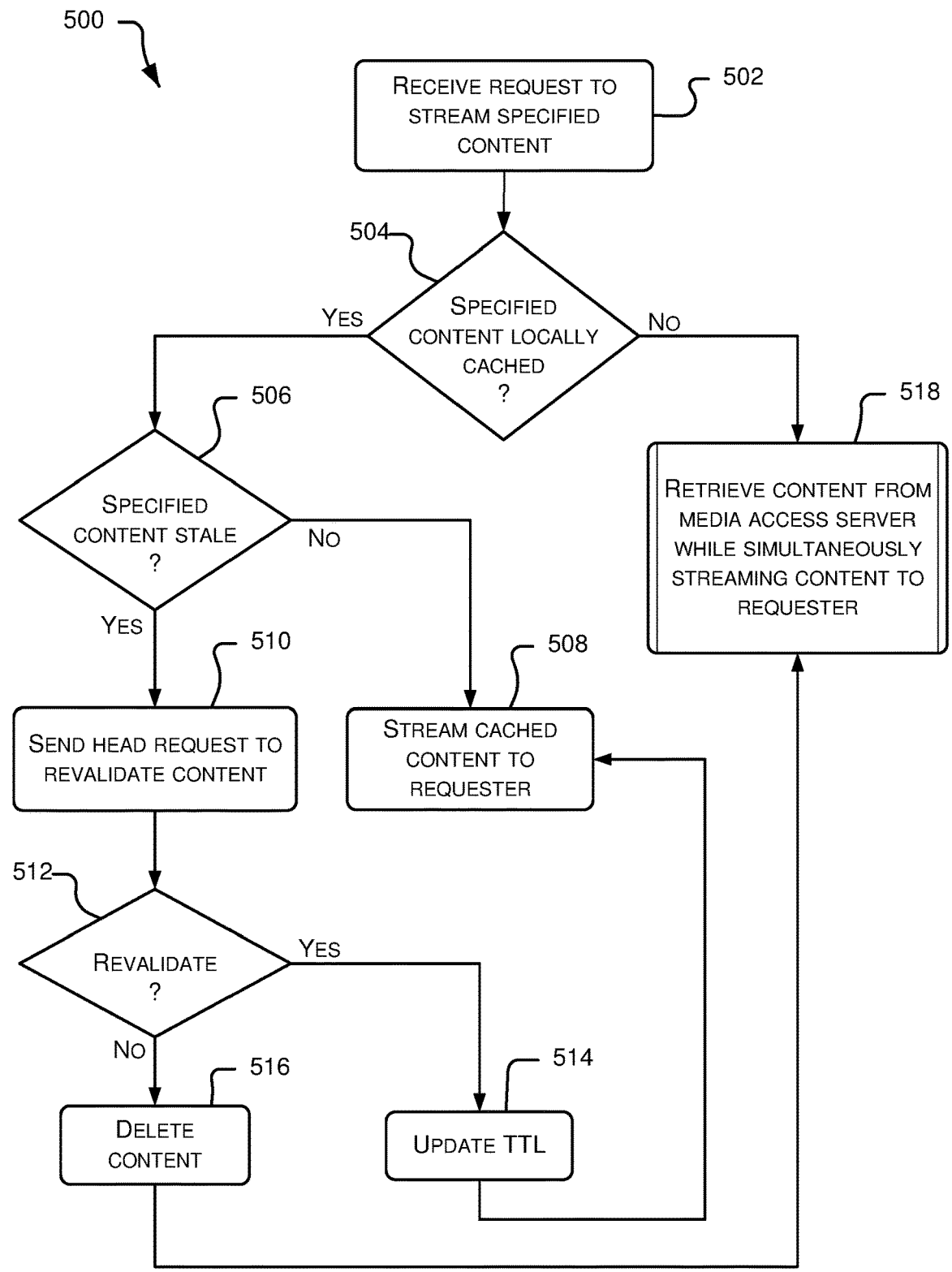
FIGS. 5-7 are flowcharts illustrating example processes for streaming content.
Figure 6:
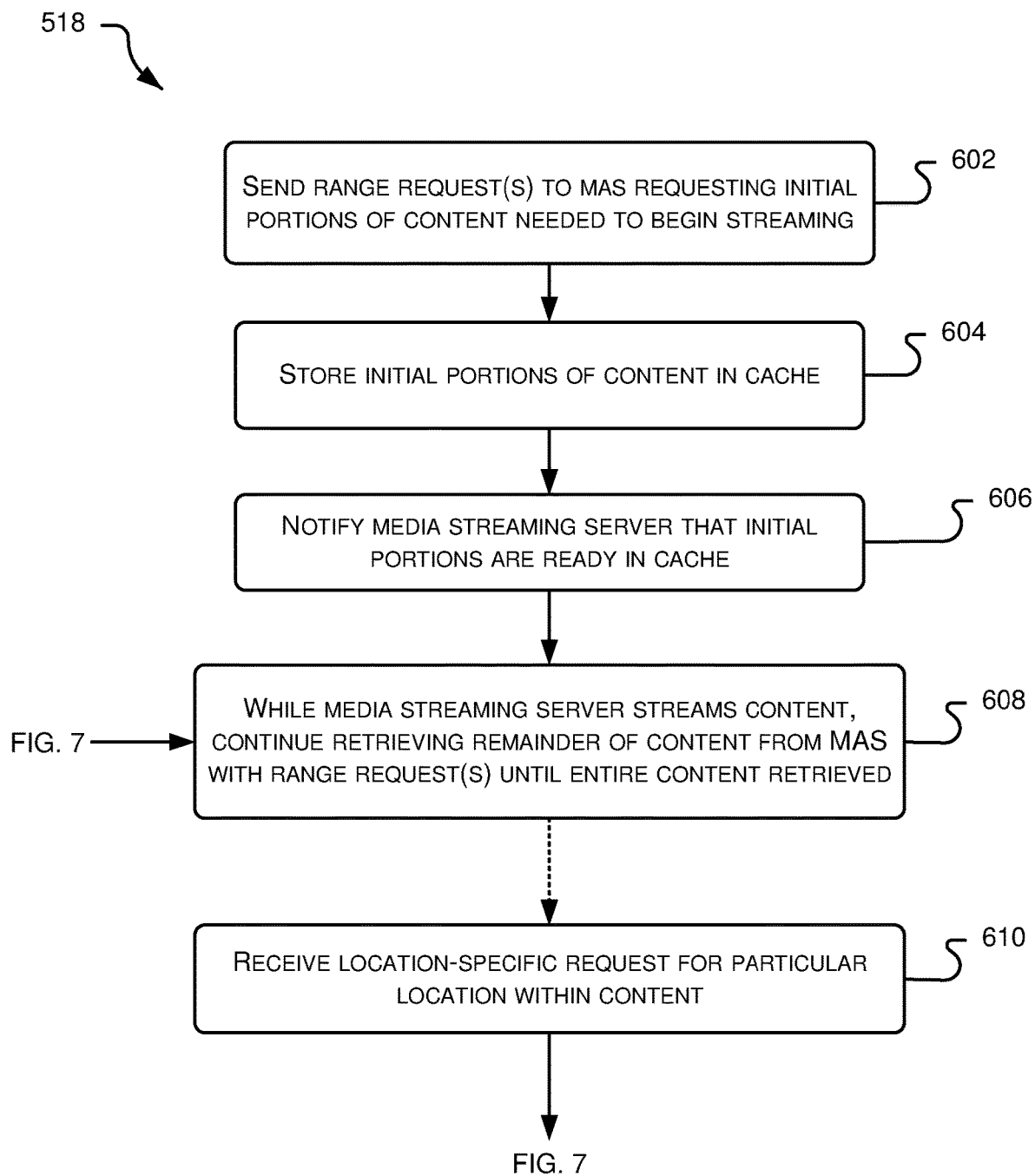
Figure 7:
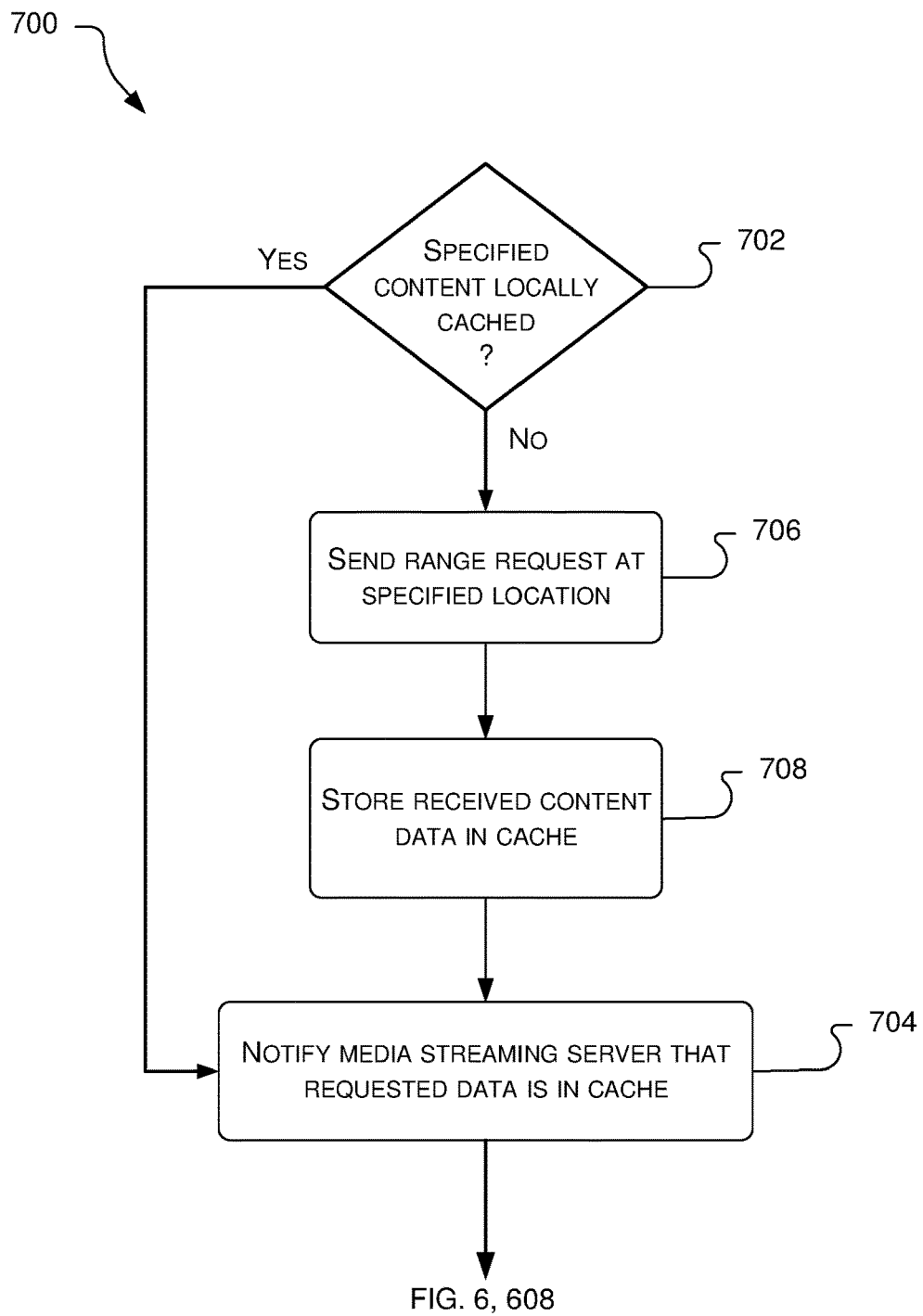

FIGS. 5-7 are flow charts illustrating processes for handling a request to deliver content. As described below, content and/or network analytics can be monitored and/or analyzed at any step in the processes. In general, the processes include determining whether content in a local cache is available to be streamed and, if so, streaming the requested content to the requester from the local cache; if not, content is revalidated and/or retrieved from a media access server and simultaneously streamed to the requester. The operations need not be performed in the particular order shown. The operations can be performed by functional modules such as one or more of the media streaming server 206, streaming media broker 208 and stream caching module 210 (FIG. 2), or other modules.

Referring specifically now to FIG. 5, in content request handling operation 500, a request is initially received for specified content in receiving operation 502. The requested content is identified in the request. A query operation 504 determines if the requested content exists in local cache. If it is determined that the requested content exists in local cache, another query operation 506 determines if the content in local cache is stale. In one embodiment, query operation 506 compares the age of the locally cached content to a TTL value associated with the content, and if the age is greater than the TTL value, the content is stale; otherwise the content is not stale.

If the locally cached content is determined to be not stale, the operation 506 branches "NO" to streaming operation 508. In streamlining operation 508, the locally cached content is streamed to the requester. On the other hand, if the locally cached content is determined to be stale, the operation 506 branches "YES" to sending operation 510.

In sending operation 510, a HEAD request is sent to a media access server (MAS) to revalidate the locally cached content. In another query operation 512 checks the response from the MAS to determine whether the locally cached content is revalidated. If the content is revalidated, the operation 512 branches "YES" to updating operation 514. Updating operation 514 updates the TTL value associated with the locally cached content, so that the locally cached content is no longer stale. The locally cached content is then streamed in streaming operation 508.

Returning to query operation 512, if the response from the MAS indicates that the locally cached content is not revalidated, the operation 512 branches "NO" to deleting operation 516. Deleting operation 516 deletes the locally cached content. After deleting operation 516, and if, in query operation 504 it is determined that the requested content is not in the local cache, the operation 504 branches to retrieving operation 518. In retrieving operation 518, the requested content is retrieved from the MAS while the content is simultaneously streamed to the requester.

In one embodiment retrieving operation 518 retrieves the content using a data transport protocol (e.g., HTTP) while simultaneously delivering the content using a streaming media protocol. Examples of the retrieving operation 518 are shown in FIGS. 6-7 and described below.

FIG. 6 is a flow chart illustrating a simultaneous retrieval and streaming operation 518. The operations shown in FIGS. 6-7 are typically performed by a stream caching module, such as SCM 210 (FIG. 2), or similar component. The descriptions and scenarios described with respect to FIGS. 6-7 assume that the media access server (MAS) has a non-stale copy of the requested content.

In the case of HTTP, GET requests are sent to the MAS in sending operation 602. The initial one or more GET requests request portion(s) of the content that include metadata describing the layout of the content so that streaming of the content can begin. In one embodiment, for example, when the content to be retrieved in Flash™ media, the first one or two GET requests are range requests for a front portion of the content and an end portion of the content, which contain metadata used to begin streaming.

A storing operation 604 stores the retrieved portions of the content in cache. A notifying operation 606 notifies the streaming media server that the initial portions of the requested content are in cache and ready for streaming. The streaming media server will responsively begin streaming the requested content. Meanwhile, the SCM will continue to retrieve portions of the requested content in retrieving operation 608.

The retrieving operation 608 includes sending one or more additional GET requests for ranges of data in the requested content to the MAS. Content data received from the MAS is stored in cache where the streaming media server can access the content for continued streaming. In one embodiment, retrieving operation 608 retrieves portions of the content sequentially. The portions of content are of a size specified in the range requests. The portion sizes may be set or adapted, depending on various design or real-time parameters. In some embodiments, the portion size is set to 5 MB, but other sizes are possible and likely, depending on the implementation. Retrieving operation 608 continues until the entire content file has been retrieved and stored in cache.

During retrieving operation 608, a location-specific request may be received in receiving operation 610. When a location-specific request is received, the usual order of content retrieval (e.g., sequential) is temporarily interrupted to retrieve content data from the particular location specified in the location-specific request. A particular embodiment of a process of handling a location-specific request is shown in FIG. 7 and described further below.

After handling a location-specific request, the retrieving process 608 resumes. Retrieving operation 608 can continue to retrieve data sequentially after the location specified in the location-specific request, or the retrieving operation 608 could resume retrieval sequentially from where it was when the location-specific request was received.

FIG. 7 is a flow chart illustrating a location-specific requesting handling operation 700, which can be used to respond to a location-specific request when content is being streamed to the requester. As discussed, a location-specific request is a request to provide data at a particular location within content that is currently being streamed. Streaming media protocols are adapted to promptly move to a requested location within a content file.

However, in progressive download protocols, such as progressive download schemes often used with HTTP, moving to a particular place in the content while the content is being downloaded often causes delays because progressive download requires that all data prior to the desired location is downloaded first. Using the scheme shown in FIGS. 6-7 enables streaming of content that would otherwise be delivered via progressive download over a data transport channel, thereby reducing or removing delay associated with a move to a particular location in the content.

Initially, in moving operation 700, a query operation 702 determines whether data at the particular location specified in the location-specific request is stored in local cache. Query operation 702 may utilize a tolerance, whereby it is checked that at least a certain minimum amount of data after the specific location is stored in the local cache. For example, query operation 702 may check that at least 1 MB (or some other amount) of data after the specified location is stored in local cache. By using a tolerance, the moving operation 700 can avoid delays by ensuring that at least a minimum amount of data at the specified location is available for streaming.

If it is determined that at least the minimum amount of data is stored in local cache, the query operation 702 branches "YES" to notifying operation 704. Notifying operation 704 notifies the media streaming server of the location in cache that the requested data is at for delivery. After notifying operation 704, the operation 700 returns to retrieving operation 608 (FIG. 6). As discussed above, retrieving operation 608 may continue retrieving portions of the content after the location specified in the location-specific request, or resume retrieval from the location prior to receiving the location-specific request.

Referring again to query operation 702, if it is determined that the minimum amount of data at the specified location is not stored in cache, the query operation 702 branches "NO" to sending operation 706. Sending operation 706 generates a GET request specifying a range of data after the specified location. The amount of data specified in the range request can be the byte count retrieved in GET requests generated in operation 602 (FIG. 6), or some other byte count. A storing operation 708 receives the requested data and stores the data in the local cache. After storing operation 708, the moving operation 700 branches to notifying operation 704 where the media streaming server is notified of the location of the requested data in cache.

Figure 8:
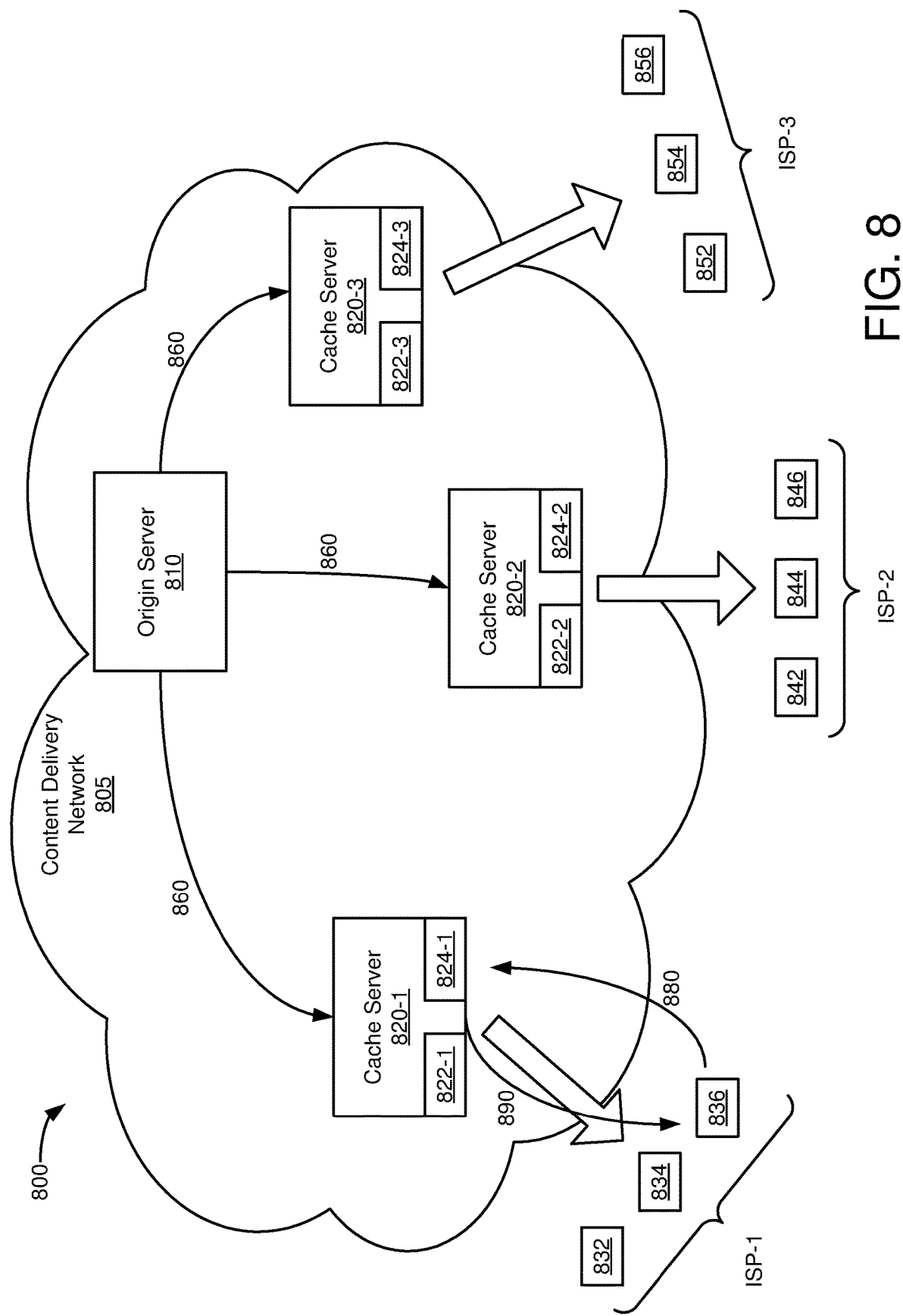
FIG. 8 illustrates another example network environment suitable for distributing content and monitoring analytics according to various embodiments.

FIG. 8 is a block diagram of an exemplary content delivery network environment 800 having a content delivery network 805 that includes an origin server 810, a cache (edge) server 820-1, a cache (edge) server 820-2 and a cache (edge) server 820-3 (hereinafter collectively cache (edge) server 820). Each cache (edge) server 820 has a respective cache memory 822-1, 822-2, and 822-3, and a respective storage system 824-1, 824-2, and 824-3 (e.g., disk-based or other persistent storage). Cache server 820-1 services requests and provides content to end users 832, 834, and 836 (e.g., client computers) associated with Internet Service Provider 8 (ISP1). Cache server 820-2 services requests and provides content to end users 842, 844, and 846 associated with ISP2. Cache server 820-3 services requests and provides content to end users 852, 854, and 856 associated with ISP3. FIG. 8 shows a cache server dedicated for each ISP for simplicity. Many other implementations are also possible. For example, in various embodiments, one or more ISPs do not have a dedicated cache server, one or more ISPs have a plurality of dedicated cache servers, or the cache servers are not even be correlated to ISPs at all. In one embodiment, for example, one or more cache servers are located remotely (e.g., within an ISP's infrastructure or at an end user's site, such as on a local area network (LAN)) and interact with a remote origin server (e.g., the origin server 810 shown in FIG. 8).

The network environment 800 in FIG. 8 portrays a high-level implementation of content delivery network 805 suitable for implementing and facilitating content and/or network analytics functionality of the various embodiments described herein. Content delivery network 805 represents just one example implementation of a content delivery network and, as such, it should be noted that the embodiments described herein are similarly applicable for being implemented in any content delivery network configuration commonly practiced in the art (e.g., see FIGS. 1-7 and associated descriptions). One example content delivery network is described in U.S. Pat. No. 7,822,871 entitled "CONFIGURABLE ADAPTIVE GLOBAL TRAFFIC CONTROL AND MANAGEMENT" filed by Paul E. Stolorz et al. on Sep. 30, 2002, and issued on Oct. 26, 2010, which is incorporated by reference herein in its entirety.

During general operation, and typically in response to a request for content, the origin server 810 distributes various content (e.g., depending on geography, popularity, etc.) to cache server 820, as shown by lines 860. Assume, for example, that end user 836 requests certain content (e.g., music, video, software, etc.) that is stored on the origin server 810. The end user 836 may be redirected—using any number of known methods—to instead request the content from cache server 820-1. As shown in the exemplary embodiment of FIG. 8, the cache server 820-1 is configured/located to deliver content to end users in ISP1. The cache server 820-1 can be selected from the group of cache servers 820 (or other cache servers in ISP-1) using any number of policies (e.g., load balancing, location, network topology, network performance, etc.). End user 836 then requests the content from cache server 820-1 as shown by line 880. Cache server 820-1 then serves the content to end user 836 (line 890) either from cache 822-1 or, if the content is not in the cache, the cache server 820-1 retrieves the content from the origin server 810.

Figure 9:
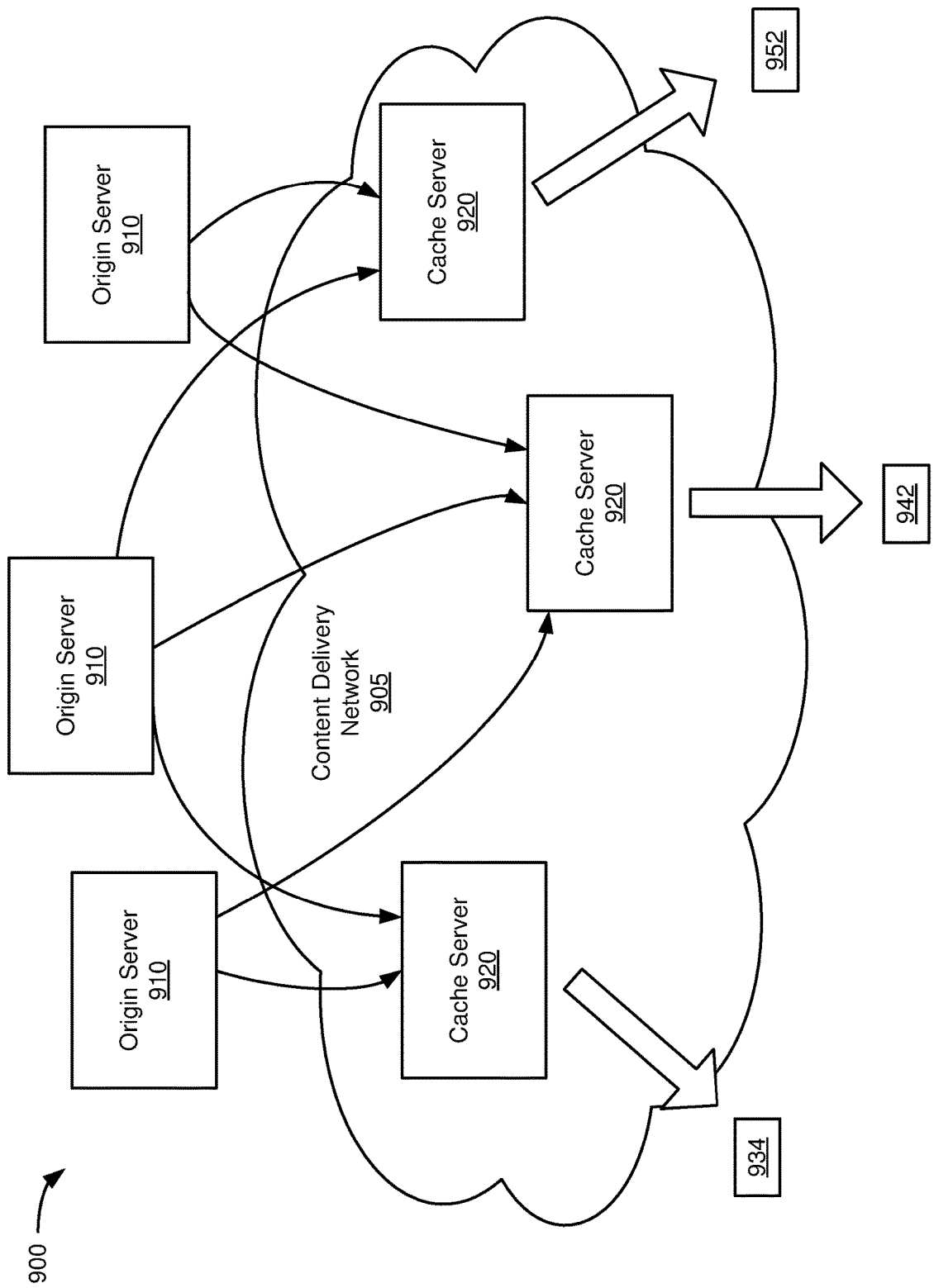
FIG. 9 illustrates yet another example network environment suitable for distributing content and monitoring analytics according to various embodiments.

Although FIG. 8 shows the origin server 810 located as part of the content delivery network 805, the origin server 810 can also be located remotely from the content delivery network (e.g, at a content provider's site). FIG. 9 shows such an embodiment in which a content delivery network 905 interacts with one or more origin servers 910 located, for example, at various content provider sites 908. In this embodiment, the content delivery network 905 includes a plurality of cache servers 920. The cache servers 920 service requests and provide content to end users 932, 942, and 952 (e.g., client computers). The origin servers 910 distribute various content to cache servers 920 as described above with respect to FIGS. 1-8.

Figure 10:
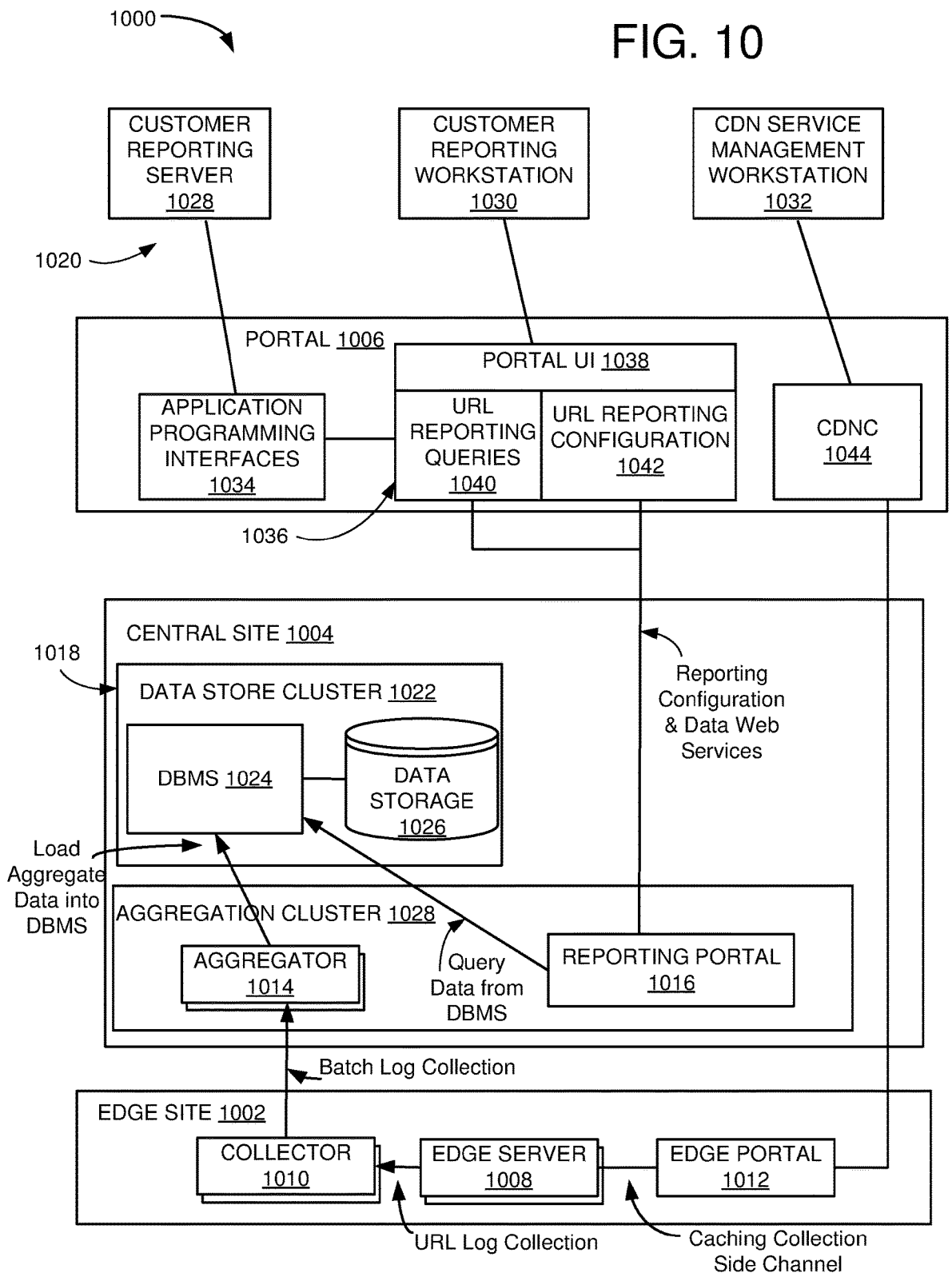
FIG. 10 illustrates an example block diagram of content analytics management system of a content delivery network.

FIG. 10 is a block diagram of an exemplary content and/or network analytics environment 1000 including components that interact with/operate on (e.g., acquire, store, distribute, manage, aggregate, filter, etc.) content and/or network analytics with respect to content delivered via a content delivery network. In one exemplary embodiment, for example, each of the components of the analytics environment 1000 shown in FIG. 10 resides within a network of one or more CDNs and/or content providers. In this embodiment, the one or more CDNs and/or content providers have access to content and network information for the network and can use that information for compiling analytics on the content and network information for the network.

In FIG. 10, the content delivery network environment 1000 comprises a plurality of edge sites 1002, one or more central sites 1004, and one or more portals 1006. A plurality of edge servers 1008, at least one edge collector 1010, and an edge portal 1012 reside at each of the plurality of edge sites 1002. An aggregator 1014, an analytics portal 1016, and a data store 1018 reside at the central site. The portal 1006 provides access for devices 1020 such as, for example, computers, servers, workstations, customer reporting server 1028, customer reporting workstation 1030, CDN management workstation 1032, etc. Although shown as separate and distinct sites, one or more sites may be combined at a single location. The central site, for example, may reside at an edge site or a customer reporting portal may reside at the central site.

As described above, the edge servers 1008 (e.g., cache servers) service requests from clients and other caches (e.g., subsidiary caches). In one embodiment, the edge servers 1008 collect content and/or network information related to content requested from and/or delivered by the content delivery network. In this embodiment, for example, the edge servers 1008 log data related to the content for use in an analytics system.

The edge servers 1008 may also, for example, extract data (e.g., request data, deliver data, etc.) and collect information based upon the extracted data to be used in the identifying various analytics. In one embodiment, for example, the edge servers 1008 may extract data from a request for content in a content delivery network (e.g., from a URL request for content). Extracting data from a request for content may include, but is not limited to, selecting records of a request, computing byte counts, transforming data (e.g., for reporting), computing derived flags, determining one or more Autonomous System Numbers (ASNs) associated with one or more networks from which requests originate, concatenating or extending data, validating data, extracting tokens, tags or other information, etc., or any combination thereof. The edge servers 1008 may further collect data for use in an analytics system (e.g., by a collector or other stage), age/discard uncollected or collected data, and monitor staging status (e.g., queue size, queue latency, count discards, etc.).

In one embodiment, for example, data may be aged and/or discarded based upon flexible policies or parameters (e.g., available space).

The analytics environment 1000 further includes edge collectors 1010. The number of edge collectors 1010 can depend upon their performance and content subscriber's utilization of content and/or network analytics services. In one embodiment, for example, a single edge collector 1010 may serve a production rack of edge servers 1008 (e.g., 20 edge servers) and may be allocated from a pool of infrastructure administrative machines. While FIG. 10 shows the edge collectors 1010 as separate components in the analytics environment 1000, functionalities of the edge collectors 1010 may be performed in the edge servers 1008 themselves and/or in aggregators 1014 at a central location (e.g., at the central site 1004).

In one embodiment, an edge collector 1010 can provide functionality at the edge of the analytics system 1000 without impacting or at least minimizing the impact to the core functionalities of the edge servers 1008 (e.g., processing requests for content and delivering the requested content). The edge collector 1010, for example, can access configuration information for the analytics system 1000 (e.g., via configuration tables) and be controllable by a management process. In one embodiment, for example, the edge collector 1010 can run an agent that provides access to configuration information and/or provides control of the edge collector 1010 from a management process. The edge collectors 1010 can further collect log records (or other information) from edge servers 1008, process the log records (or other information), assemble the log records (e.g., bin and compress the log records into batches), and stage or prepare the log records for collection (e.g., by an aggregator 1014). The edge collectors 1010 may additionally provide metrics for monitoring and alerting the analytics system 1000.

In one embodiment, the edge collectors 1010 are configured (automatically or manually) to associate or match edge collectors 1010 with one or more edge servers 1008 for data collection. The configuration of the edge collectors 1010 can support failover of the collectors 1010 (e.g., within and between sites) and support seamless addition or subtraction of collectors 1010 as needed to keep up with growth and contraction of the analytics environment 1000 and analytics reporting utilization. The edge collectors 1010 collect data (e.g., log records) from the edge servers 1008. In one embodiment, the data collection is scalable, i.e., additional edge collectors 1010 can be implemented and configured (e.g., instantiated) to consume an increase in the generation of recordable events, or vice versa.

In one example embodiment, the edge collectors 1010 can implement data management and data processing policies. The edge collectors 1010, for example, can provide filtering of data collected at the edge site 1002 (e.g., based on collection specifications or the like). In one embodiment, for example, the edge collectors 1010 can test each request against a collection policy or specification (e.g., pattern, token, or tag based). The edge collectors 1010 can also implement data retention policies to discard or retain logs based on those policies. The edge collectors 1010 can, for example, discard and count logs that are too old or unrelated to an active request for analytics. The edge collectors 1010 can also perform computations, calculations, normalizations, comparisons, and other analyses of data collected. The edge collectors 1010 can further implement geographical policies (e.g., provide geographical lookup options). In addition, the edge collectors 1010 can implement other policies when overloaded. For example, an edge collector 1010 can discard and count data that are too numerous to handle within a reporting period and raise alerts identifying one or more errors.

In one example embodiment, the edge collectors 1010 can also assemble the data for easier data handling by a subsequent stage of the analytics system 1000. In one embodiment, for example, an edge collector 1010 can bin and compress data and/or logs into batches. In this embodiment, the edge collector 1010 can compute tallies based on a current data model, periodically or non-periodically (e.g., event driven) dump batches into output files for access by another stage of the analytics system 1000, and compress the batches or files for more efficient data handling.

In another example embodiment, the edge collectors 1010 can also stage the data for collection by another stage of the analytics system 1010. The edge collectors 1010, for example, can stage log records (e.g., in batch output files) for access by an aggregator 1014 of the analytics environment 1000. The edge collectors 1010 can also age and/or discard data if it is too old or otherwise handle the data according to a data management or handling policy. While, in this embodiment, the edge collectors 1010 can stage the data for collection by another stage of the system, the edge collectors 1010 may alternatively actively transmit or otherwise handle the data for transmission to another stage of the analytics system 1000 for analysis.

In yet another example embodiment, the edge collectors 1010 can additionally provide metrics for monitoring and alerting to the analytics system 1000. For example, the edge collectors can support capacity planning, such as by monitoring collection and processing stats (e.g., CPU or memory utilization, compression rate, data bandwidth, ASN, etc.) that affect capacity of the content delivery network. The edge collectors 1010 can also support service management, such as by monitoring staging status (e.g., queue size and latency, discard counts, etc.).

The analytics environment 1000 further comprises one or more aggregators 1014. The aggregator 1014, for example, may be associated with two or more servers (e.g., a 'cluster' of servers); whereby the aggregator 1014 is operable to consolidate batch tallies from the edge collectors 1010 into reporting data stored in a data store 1018 (e.g., a data store cluster 1022 comprising a database management system 1024 and data storage 1026). In one implementation, for example, the reporting data stored in the data store 1018 can be accessed via a reporting portal 1016 as shown in FIG. 10.

The aggregator 1014 can provide access to configuration information (e.g., via configuration tables) and management control of an analytics system 1000 of the content delivery network. In one embodiment, for example, the aggregator 1014 runs at least one agent providing access to configuration tables and management control of the content analytics system. Where the aggregator 1014 comprises an aggregation cluster 1028 including a plurality of aggregator servers 1014 and a reporting portal 1016 as shown in FIG. 10, all or a subset of the aggregator servers 1014 of the cluster 1028 may run such an agent.

The aggregator 1014 can collect data (e.g., batches or other forms of data) from the edge collectors 1010 (e.g., locate and pull data from the edge collectors and/or receive data transmitted by the edge collectors). The aggregator 1014 can also buffer data by various portioning criteria (e.g., by time bin, date bin, content identifier bin, etc.). At intervals (periodic or non-periodic) the aggregator 1014 can aggregate the batches into complete data sets describing particular bins (e.g., time bins). In this embodiment, the aggregator 1014 can perform computations or other data manipulation according to a data model. For example, the aggregator 1014 can perform counts according to a collection specification, manage data dictionaries (e.g., URLs, referrers, etc.) for periodic time periods (e.g., per second, minute hour, day, month, etc.) or non-periodic durations (e.g., event driven durations), provide count detail of events exceeding limits (e.g., as "OTHER"), facilitate performance and/or marketing analyses by tracking ASNs from which requests originate, track growth of detail objects (e.g., "OTHER") to gauge integrity of detail data, and so on. The aggregator 1014 can dispatch work (e.g., calculations or other data manipulation) across multiple processors (e.g., parallel processors). The aggregator 1014 can incorporate late-arriving data that falls within a latency window and discard (and count) late-arriving data that falls outside a latency window, produce and maintain data (e.g., periodic or non-periodic), etc. The aggregator 1014 can also export the data model and load the model into the data store 1018 (e.g., the data store cluster 1022 comprising the database management system (DBMS) 1024 and the data storage 1026). In this embodiment, incremental data updates may be performed according to a policy or procedure. The aggregator 1014 can also age out or otherwise handle already-processed data.

The aggregator 1014 can also provide monitoring, management and redundancy. For example, the aggregator 1014 can monitor data buffering and processing (e.g., latency, queue sizes/back log, times to process, discards, storage utilization, ASNs, free space, CPU utilization, time to load to a data store, etc.) in support of system operation, capacity monitoring, planning, and the like. The aggregator 1014 may also provide cluster management procedures, such as hardware replacement (e.g., server or drive), hardware augmentation, data redistribution, maintenance, etc. The aggregator 1014 can also support a redundant aggregator (e.g., a redundant aggregator cluster) in an alternate location that can share load, or be in a standby state to take over in the event of maintenance or disaster.

As described above, the analytics environment 1000 comprises a data store 1018 that stores and retrieves reporting data. In one embodiment, for example, the data store 1018 comprises a data store cluster 1022 implementing a database management system (DBMS) 1024 that controls storing and reporting data. The data store 1018 may further provide a scalable database management system implementing a data model. In this embodiment, the data store 1018 supports scaling across multiple drives by multiple servers and may use commodity components. The data store 1018 can load exported data from the aggregator 1014 as it is processed (e.g., a DBMS 1024 can define how incremental data updates are performed such as via replacement or addition). The data store 1018 can further control data aging and management. For example, the data store 1018 may discard data over pre-defined age limits (e.g., monthly data may be discarded after a thirteenth month, daily data after a second month, etc.). Data rollups can be computed in the data store 1018 (and/or in the aggregator 1014, edge collectors 1010, or edge servers 1008). Further, the data store 1018 can track administrative data.

The data store 1018 provides query interface(s) supporting presentation or other interaction with a user such as a customer or system support. For example, application programming interfaces (APIs) 1034, such as export application programming interfaces (APIs), can be provided using pre-defined conventions that allow a customer or other user to access and search the reporting data stored in the data store 1018. In addition, the APIs 1034 may be provided for particular pre-defined or customized report specifications.

The data store 1018 may also monitor operations, such as storage utilization, free space, CPU utilization, DBMS statistics, etc., in support of operation, capacity monitoring, planning, and the like. The data store 1018 can also provide cluster and DBMS management procedures, such as hardware replacement (e.g., server, drive), hardware augmentation, data redistribution, maintenance, etc. The data store 1018 may also support a redundant mirror or parallel data store cluster in another location that can either share the load of the data store or be on standby to take over in the event of maintenance or disaster.

The analytics environment 1000 further comprises a portal 1006 (e.g., a portal server) that provides a presentation layer 1036 to internal and/or external users. The presentation layer 1036 of the portal 1006, for example, can provide a portal user interface (UI) 1038 (e.g., a graphical user interface (GUI)) for analytics reporting and APIs, such as APIs 1040 for obtaining reporting data as well as APIs 1042 for managing reporting configuration (e.g., data collection specifications). In this embodiment, the portal 1006 can integrate functionalities into an enabled portal (e.g., authentication, navigation, presentation style, etc.). The portal 1006 can further provide both GUI controls and file exports (e.g., PDF, CSV, and the like).

The portal 1006 can also request, manage, and fulfill scheduled or requested reports. For example, the portal 1006 can provide a GUI 1038 that enables subscribers/customers to manage their collection specifications and other settings for managing their content and/or network analytics. The portal 1006 can also access the data store 1018 (e.g., using one or more APIs) to retrieve data and populate user interface (UI) controls. The portal 1006 can also provide access to a reporting portal 1016 using APIs to manage collection specifications and reporting settings.

As described above, the analytics environment 1000 further comprises a reporting portal 1016. In the embodiment shown in FIG. 10, the reporting portal 1016 comprises a portal server that answers queries for reporting data and reporting service management from a portal 1006 in the analytics environment 1000. The reporting portal 1016, for example, may be collocated at a central site 1004 with the aggregator 1014 and data store 1018 (as shown in FIG. 10). In one particular embodiment, the reporting portal 1016 provides interface(s) for managing reporting configurations, but not for accessing data, although other embodiments are contemplated. The responsibilities of the reporting portal 1016, for example, comprise retrieving collection specifications for one or more servers and setting collection specification settings. Although the portal 1006 and the reporting portal 1016 are shown as distinct portals in FIG. 10, the portal 1006 and reporting portal 1016 may be combined into a single portal.

The analytics environment 1000 further comprises a content delivery network configurator (CDNC) 1044 that performs service management for a caching network of the content delivery network. For the content analytics system shown in FIG. 10, for example, the CDNC 1044 further provides configuration support for the analytics system 1000. In one embodiment, for example, the CDNC 1044 manages per-subscriber and per-coserver options. These options, for example, may comprise service level options (e.g., none, basic, premium, etc.), token name for token-based reporting, and other option settings and limits that may be defined. In this embodiment, the CDNC 1044 further integrates with service image and billing operations of the content delivery network and manages per-coserver collection specifications. In another embodiment, however, the per-coserver collection specifications are alternatively managed elsewhere within the analytics environment 1000, such as from the portal 1006 and/or the reporting portal 1016.

Figure 11:
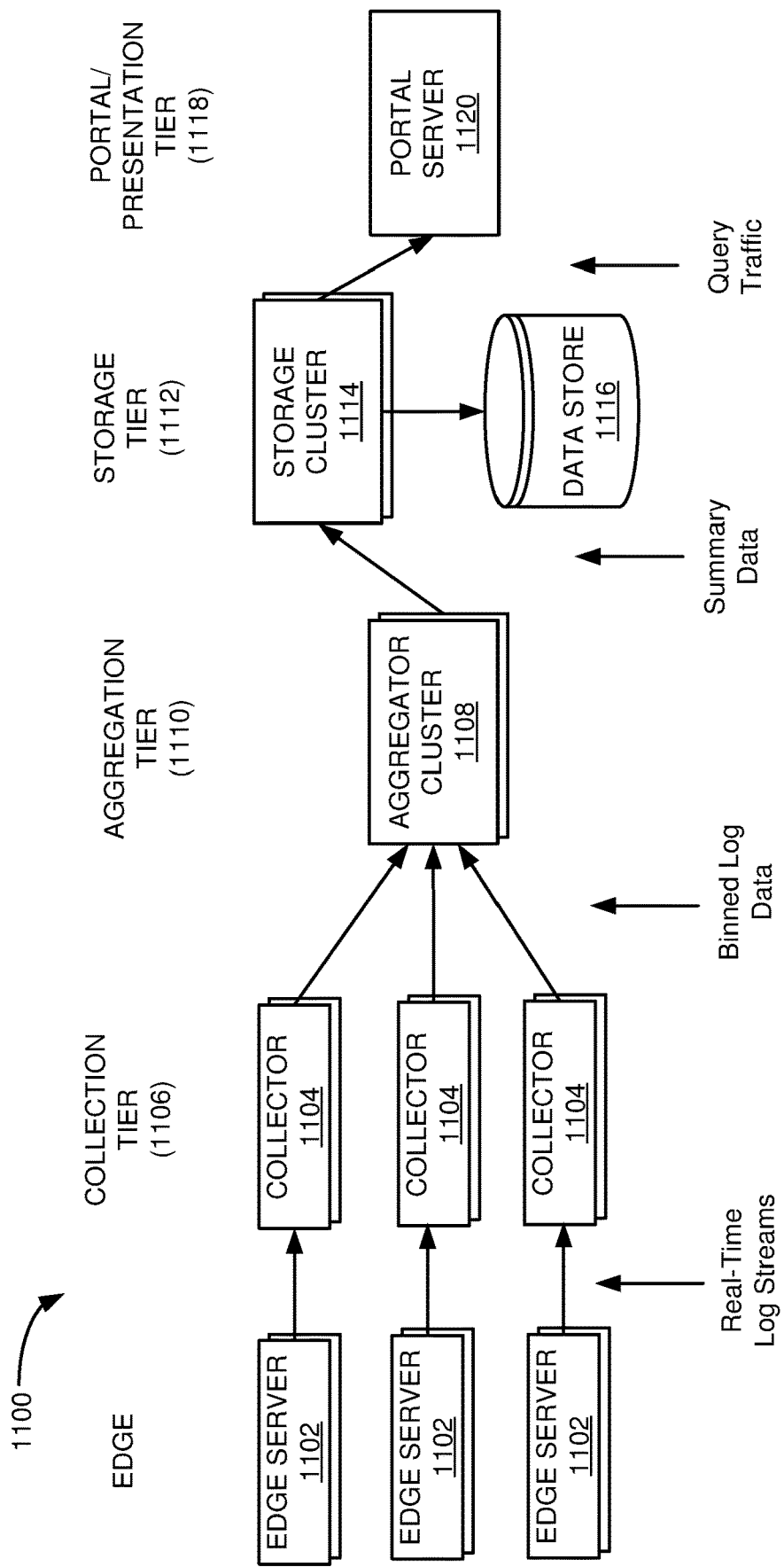
FIG. 11 illustrates an example block diagram of reporting data flows for a content analytics management system of a content delivery network.

FIG. 11 shows an example block diagram of a data flow reporting system 1100 of a content and/or network analytics system, such as the analytics environment 1000 shown in FIG. 10, for reporting data flows within a content delivery network. In this data flow reporting system 1100, for example, a plurality of edge servers 1102 are located at or near an edge of a content delivery network and report events detected for the content delivery network. A plurality of edge servers 1102 and a plurality of collectors 1104 together make up a collection tier 1106 (or stage) in which each edge server 1102 provides data to an edge collector 1104 that tallies data/log entries for a plurality of edge servers 1102 into bins. In one particular example, a single edge collector 1104 may provide collection services for a rack of edge servers 1102. In addition, one or more spare edge collectors 1104 may be provided for each edge site housing a plurality of edge servers 1102.

An aggregation tier 1110 comprises one or more aggregator clusters 1108. In one embodiment, for example, the aggregation cluster 1108 comprises a Hadoop cluster that buffers binned data during an aggregation window. The aggregation cluster 1108 further calculates and stores overall tallies and data dictionaries into data storage.

A data storage tier 1112 comprises a storage cluster 1114 and a data store 1116 and stores reporting data, taking updates from the aggregation cluster, and allows retrieval via supported queries. In this embodiment, the data storage tier also manages data (e.g., data aging and retention).

A portal and presentation tier 1118 comprises a portal server 1120 that submits queries and receives results using an interface. The interface, for example, may be designed specifically for a particular data model and may be accessible, for example, by internal and/or external agents.

In one embodiment, a data model comprises a service image for URL reporting. The service image, for example, may comprise per-subscriber and/or per-coserver option settings, a set of collection specifications for each coserver (and/or per-subscriber), and the like. The specifications specify URLs to be reported and, according to one embodiment, for which dimension(s) of the data to report. Data collected can be associated with a particular collection specification from the point of entry in the system through to the presentation interfaces.

In one embodiment, a set of global system-wide options are provided in which the global options can be defined and/or tuned on a system-wide basis. In one particular implementation, for example, global options may comprise the following:
   Default and maximum numbers of collection specifications;
   Default and maximum numbers of detailed collection specifications;
   Default and maximum numbers of unique URLs to collect per detail collection specification;
   Default and maximum numbers of unique referrer to collect per summary collection specification; and
   Latency window and other data retention parameters.

In this embodiment, per-property options are also set within the data model. For example, per-property options may be set per subscriber-ID and/or per-coserver ID. In one particular implementation, for example, the per-property options may comprise the following:
   Level of service (e.g., none, basic, premium)
      If level is "none," no logs will be generated at the edge and the portal can prevent attempts at enabling collection that would be ineffective
      If level is "standard," only standard level features are available
      If level is "premium," additional premium level features are available
   Token parameter name
   Number of collection specifications, both summary and detail
   Number of summary collection specifications
   Number of detail collection specifications
   Number of unique URLs per detail collection specification
   Number of unique referrers per summary collection specification In various embodiments, the above per-property options may be user customizable.

In an example embodiment, collection specifications can define measures that an analytics system collects (e.g., numbers of requests and bytes served), which can be further broken down by various dimensions. Dimensions can include, for example, time, URL, ASN, and/or various other attributes of requests and responses handled by the content delivery network. Collection specifications can control which requests are counted: e.g., wherein each specifies a collection of statistics to be reported. In one particular implementation, two types of collection specifications are supported: 1) summary, and 2) detail; although other types of collection may be additionally or alternatively supported. Summary specifications, for example, may provide for tracking aggregate data regarding a set of URLs, while detail specifications may provide for additional tracking of individual URLs themselves. In this particular implementation, every detail specification also provides summary specifications, although summary and detail specifications may be distinct in alternate implementations.

In this embodiment, each collection specification can be defined by the following:
   A selection criterion, specifying which requests it will track. In one implementation, this may be either:
      A URL wildcard expression to match against a canonical URL; or
      A token value to match against a per-coserver configured token parameter.
   A set of flags indicating which dimensions are to be reported. In one implementation, available dimensions are limited based on whether the subscriber has subscribed to a premium service level.
   Example dimensions include the following:
      HTTP Status Code
      Extended Status: Cache Hit
      Extended Status: Download Complete
      Extended Status: Authenticated Content
      Extended Status: Content Encoding Type
      Referrer Domain Name
      Autonomous System Number (ASN)
      Serving Location (e.g., region, city, metro, country, etc.)
      Requesting Location (e.g., region, city, metro, country, etc.)
   A flag indicating whether it is a detail or summary specification. In one implementation, a limit may be imposed on a number of detailed specifications can be defined for collecting information for detailed URLs.

The number of collection specifications and the amount of data that each may cause to be collected, can be limited in various ways. Collection specifications may be changeable via a self-service user interface and/or application programming interfaces within constraints spelled out in the options.

In one embodiment, detail collection specifications can cause two separate data sets to be collected: a standard data set for a summary collection specification and a second data set comprising URLs and HTTP status codes. The per-URL data may be broken down by other dimensions, such as dimensions mentioned above. These two data sets, however, can track corresponding data for the same set of requests. In one embodiment, the number of distinct URLs tracked in a given time period can be limited. In this embodiment, if a customer sets the criteria to too many URLs for a given time period, request for all URLs in excess of that limit can be counted as "OTHER." While the measures for URLs that are counted will be correct, the measures corresponding to those counted as "OTHER" can be lumped together into one or more sets of counts without losing all data related to those URLs. In one embodiment, when URL reporting is enabled for a subscriber and/or coserver, a default Summary collection specification matching all requests can be set. In one implementation, for example, a default Summary collection specification will only specify collection of an HTTP status dimension by default. Other default conditions may be used, however.

Figure 12:
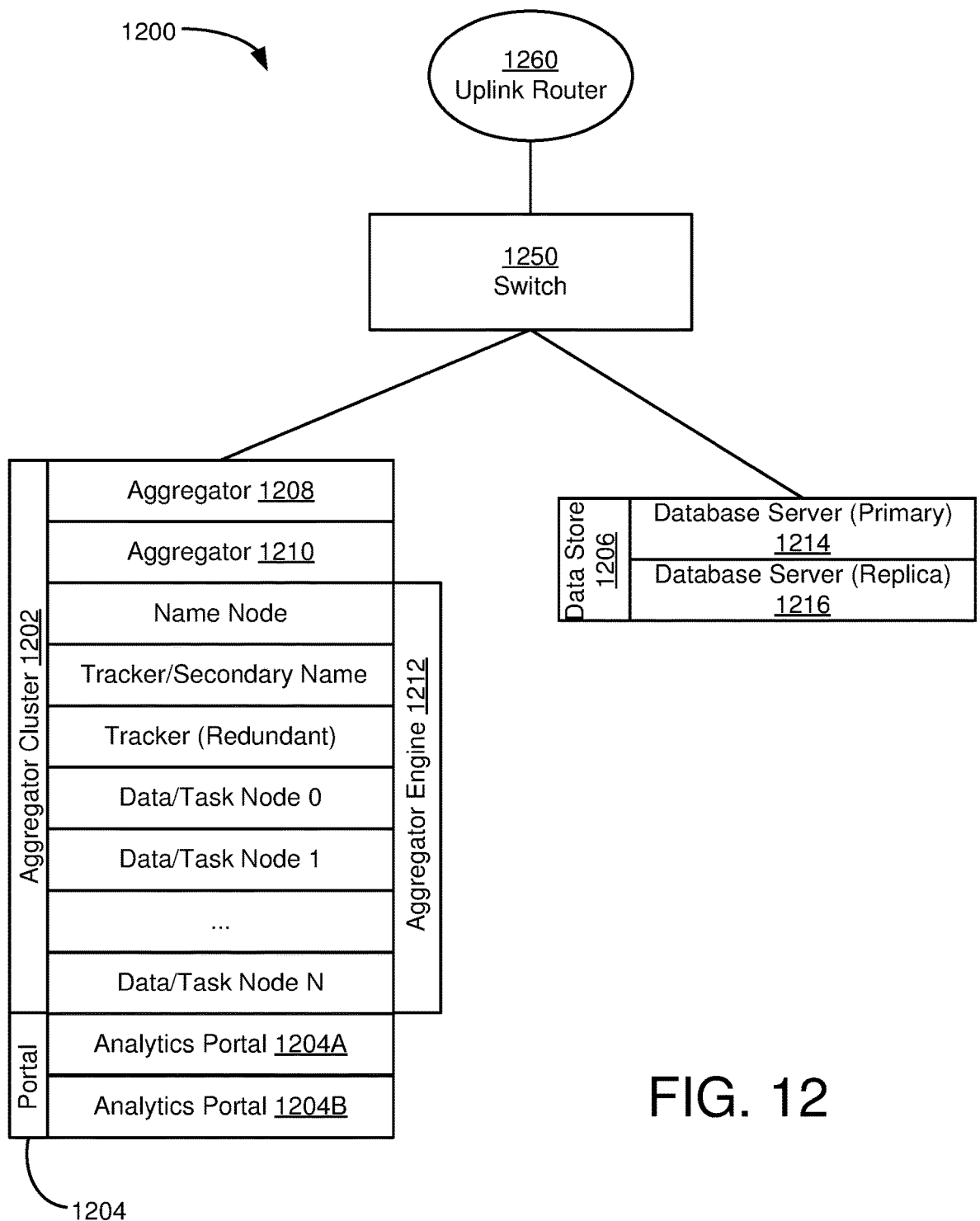
FIG. 12 illustrates a block diagram of an example central site architecture of the content analytics system of FIG. 10.
Figure 13:
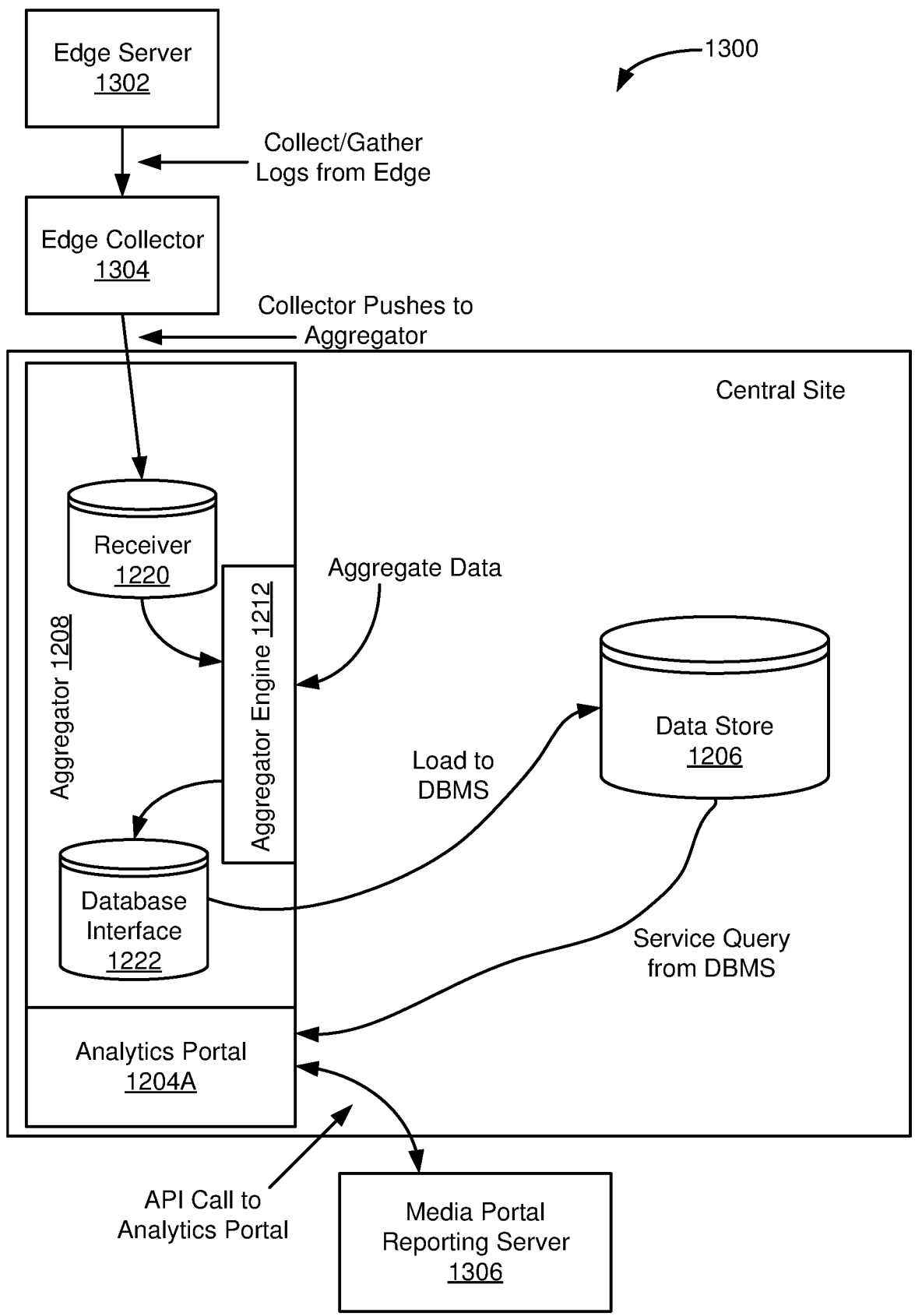
FIG. 13 illustrates an example block diagram of a data flow of the central site architecture shown in FIG. 12.

FIG. 12 shows a block diagram of an example central site architecture 1200 that includes, similar to FIGS. 10 and 11, an aggregator cluster 1202, an analytics portal 1204, a data store 1206, a switch 1250, and an uplink router 1260. FIG. 13 shows example data flows for the central site architecture 1200 shown in FIG. 12. In the example embodiment of FIG. 12, the aggregator cluster 1202 comprises a redundant pair of servers 1208, 1210 that implements the following functions (although some of the functions could be moved to other servers (e.g., dedicated servers)):

A CDN Agent (not shown);
A Receiver 1220; and
A Database Interface 1222.

The CDN agent, for example, connects to a caching network configuration and controls channels. The receiver 1220 receives compressed data batches from edge collectors 1304 that collect/gather data (e.g., logs) from edge servers 1302, stages the data until it is needed, loads the data to an aggregator engine 1212 and submits processing requests. The database interface 1222 communicates with the data store 1206, wherein the data store 1206 comprises a primary database server 1214 (and, optionally, a redundant replica database server 1216) that receive processed database transactions and load them into the database. Note that optional replica server 1216 can periodically/intermittently perform backup dumps of the complete image from primary database server 1214.

The aggregator engine 1212 comprises a parallel processing cluster that imports data batches from the receiver, processes it into database update transactions, and exports those transactions to the database interfaces 1222. In one embodiment, the engine 1212, as shown in FIGS. 12 and 13, can be constructed as a Hadoop cluster to manage its parallel processing or as a simple script (e.g., perl) in which Hadoop is used to scale it up to production traffic throughput levels. In one embodiment, the engine 1212 persists and manages periodic (e.g., monthly) or non-periodic (e.g., event driven) URL and referrer dictionaries. In one embodiment, the servers can be implemented as standard 1U servers running a standard caching operating system (OS) platform, plus any packages to support their specialized roles (e.g., Hadoop and its dependencies).

In the embodiment shown in FIGS. 12 and 13, the data store 1206 (e.g., a data store cluster) implements a database management system that stores and retrieves reporting data. In one implementation, for example, the data store cluster is built from standard 2U 12 TB (raw) storage servers with modified OS distribution to match what is used on the caching servers plus MySQL packages and their dependencies.

The analytics portal 1204 exposes an API to a reporting presentation agent (such as on media portal reporting server 1306), making available both configuration APIs to manage the analytics reporting for subscribers and data access APIs to pull reporting data out of the database. A CDN agent (not shown) can provide access to the subscriber configurations. In one embodiment, the analytics portal 1204 is run on the aggregator servers 1208, 1210 of the aggregator cluster 1202 as a separate software component. In an alternate embodiment, the analytics portal 1204 is provided on a separate server from the aggregator servers 1208, 1210.

Internal addressing within a cluster, such as an Hadoop cluster, can be accomplished via names in Hadoop configuration files, Internet Protocol (IP) addresses, or other internal addressing schemes.

The servers within the central site clusters can access each other on various ports. In one embodiment, the servers comprises a set of IP table firewall rules adjusted to allow access between the servers in the central site without allowing remote access from outside the central site to sensitive information. In one embodiment, the aggregator receiver servers are accessible from outside the central site via an SSH port. In one implementation, access to the SSH port can be manually or automatically managed.

Scalability

In one embodiment, the data store comprises a database service providing redundancy and scalability. For example, in this embodiment, database nodes are added to the system in a manner that improves insert (write) performance, query (read) performance, and storage capacity in a linear (or near-linear) manner over a reasonable range. In addition, each database node has at least one redundant copy running that can take over for writing and/or reading in the event of a failure of one of the copies. In one particular embodiment, recovery is possible from any single copy of the node. It can be acceptable that performance may suffer while running in a degraded state.

In one embodiment, the data store comprises a sharded database in which each shard is stored on a node, which itself is a replicated Active/Passive Master/Master Pair. The passive node can be used for snapshot backups and extra query bandwidth when it is available, as well as for failover redundancy. In one embodiment, sharding is visible to the application, in the sense that the client will consult with a distributed service call to get the name of the database to connect to given the parameters of a query. In this manner, shard-to-node allocation metadata can be stored in a collection specification table; while whole node-to-server metadata can be stored in a host table.

In one particular implementation, a sharding key is the property (coserver) ID. In this implementation, no queries need to join across distinct coserver IDs. This implies that there is one shard allocated per coserver. Information for each property, including collection metadata, dictionaries and all retained data for a given time period, is stored together in one database shard. This data can be further subdivided into partitions at some granularity (e.g., hourly data per month, or per slot per month) in order to simplify data aging and backup, and reduce index sizes for better performance.

Dictionary and definition data can be shard-specific (local) and continue to be referenced by all properties residing in the shard, but can use globally unique IDs (GUIDs) to allow for data migration across shards. In one implementation, a compact, integer-based GUID scheme and a lightweight distributed service for generating the GUIDs is provided. In this implementation, data specific to a collection uses native data, GUIDs, or other globally unique identifier. In one particular implementation, for example, GUIDs are globally monotonically increasing, rather than being based on a pseudorandom function, although other implementations are possible. Reference data, such as geo location IDs, can be globally, statically numbered and kept updated and/or replicated to all shards. For this type of data, simple integer IDs can be used if they are identical on every node, including masters and replicas.

Allocation of shards to database servers can be dynamic with a mapping stored in a metadata table. In this implementation, one logical database created per shard can be housed on that node.

Queries originate in the content analytics portal service scripts and are coserver-specific, and thus do not require a cross-shard join. Specialized code in the service scripts can be used explicitly to query the metadata first and dispatch data queries to the appropriate shard. Alternatively, a MySQL proxy can be used to route queries to support more general clients.

In one embodiment, a database loader adds data to the database in batches originating from the aggregator. This data can be inserted in bulk using LOAD DATA INFILE statements, as well as INSERT . . . SELECT queries, UPDATES, etc. These batches include data from multiple coservers. To achieve particular performance, the database loader runs independently on each shard in this embodiment. Use of a central dispatcher or intermediate queue is not required.

Dedicated scripts based on MySQL mk-archiver and mk-parallel dump can be run locally on each shard node to manage a portion of the data (e.g., to archive/expire old data and back up current data for emergency recovery). In order to ensure a coherent backup image, replication can be temporarily disabled and a backup can be taken from a paused replica. Alternatively, database updates can be suspended while backups are being run. In one implementation, the use of mk-archiver can be replaced with a partitioned scheme where data (e.g., each month's data set) is stored on a separate partition, and at an appropriate time, the table associated with the data is dropped rather than using mk-archiver to delete individual rows. In order to streamline individual (e.g., nightly) backups, a partition scheme can make incremental backups simpler (e.g., only re-copying a current month's data) and data can be replicated to a passive replica and backups performed from the replica with replication "paused" if it is up and current.

In one embodiment, a system supplies a service allowing clients to determine which server holds a given shard without becoming a performance bottleneck. In one implementation, this maps a coserver ID to a (server, database name). When the database loader adds data for a new coserver to the system, the loader selects an appropriate server to store its shard. The strategy is based on current load and capacity of available shards. In one implementation, for example, a policy is used to select a database node with the most (or sufficient) free space and may additionally factor in load (e.g., daily average CPU and/or disk load) if available.

For scalability, nodes can be added to the system to increase capacity within a useful operating range. When adding a node, or even at other times, some existing shards can be migrated between nodes to balance a load and/or to address hot-spots. In one implementation, a flag in the shard metadata to suspend read or write access to that shard can be used during migration and similar maintenance.

In this embodiment, global metadata and global reference data span across all the shards. The global metadata comprises data such as a mapping of which coserver ID (shard) resides on which node, and which physical servers are serving which nodes. This information is dynamic and, in one implementation, can be stored in tables that provide reliability and distribution of the data. Global reference data, such a geo-location region names and hierarchy can be considered generally static, only changing occasionally, but is available to all shards for being joined with reporting data using long-term identifiers (e.g., geo region names or AS numbers). Reference tables can be installed from rpm package managers on each database server.

Figure 14:
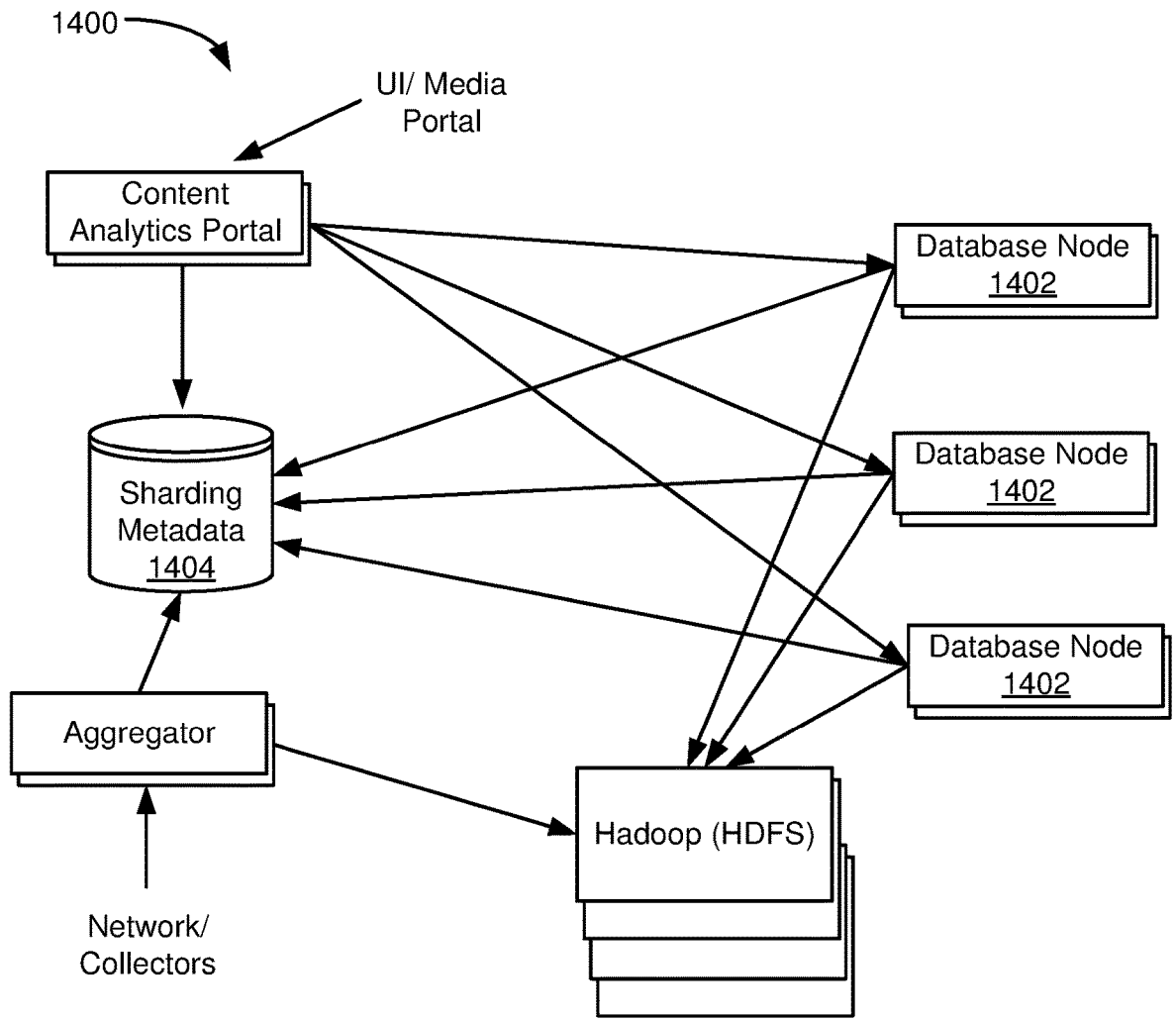
FIG. 14 illustrates an example block diagram of a sharded database system for use within a content analytics management system of a content delivery network.

FIG. 14 shows a block diagram of an example sharded database system 1400 for use within a content analytics system of a content delivery network. In FIG. 14, each block represents one or more server machines. In one particular embodiment, each database node 1402 runs a MySQL database server, although other implementations are possible. The MySQL database server holds data for one or more shards. Mapping metadata, describing which nodes hold which shards, is stored in tables instead of in the MySQL databases themselves. In FIG. 14, for example, these tables are represented by the shared metadata object 1404.

Figure 15:
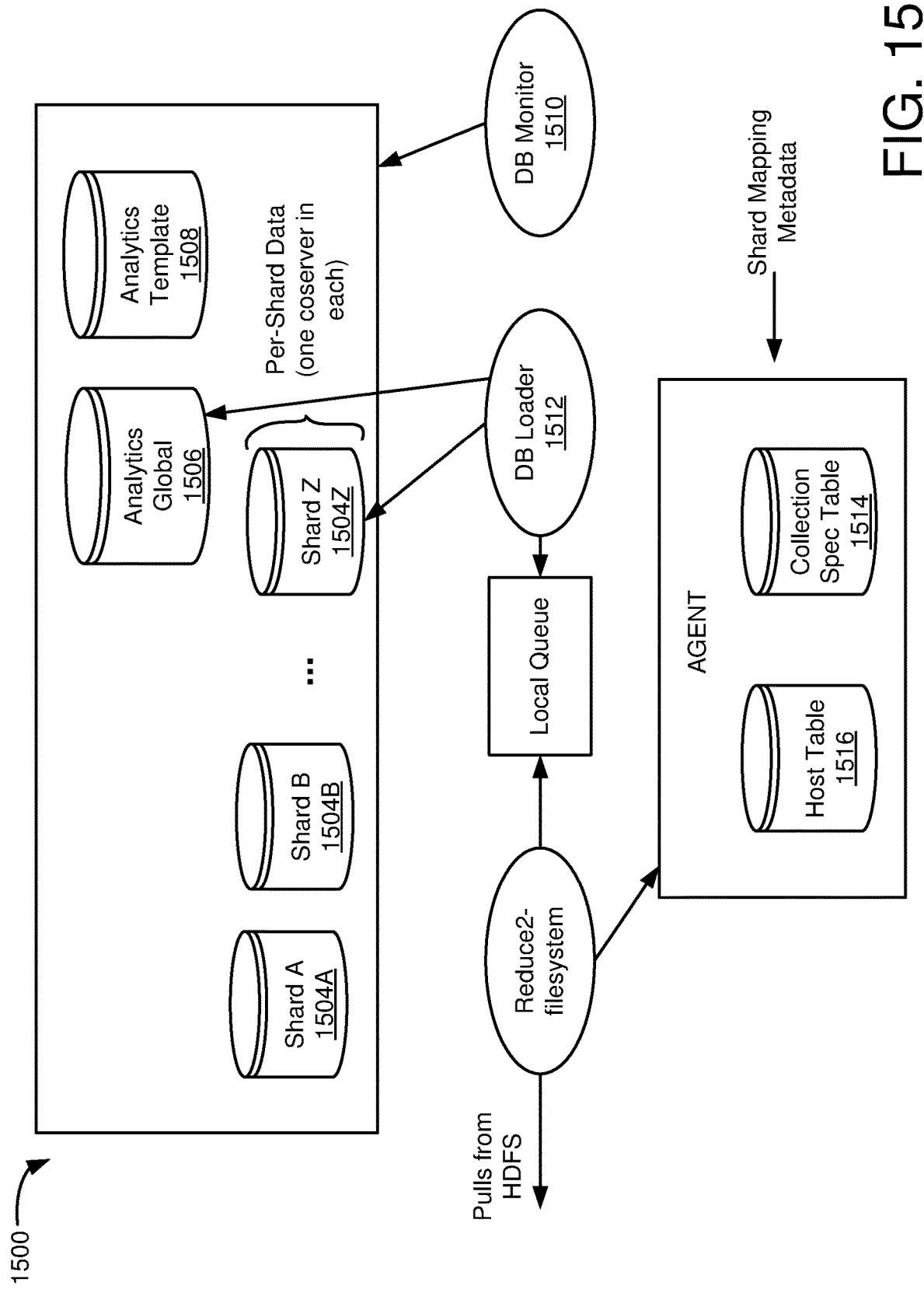
FIG. 15 illustrates a block diagram of an example node of the sharded database system shown in FIG. 14.

FIG. 15 shows a block diagram of an example database node instance 1500 (e.g., a MySQL Server instance) of database nodes 1402 shown in FIG. 14. In FIG. 15, the database node instance 1500 includes shard instances 1504A, 1504B, . . . 1504Z, plus databases for global reference data 1506 and an empty shard template 1508. Additional software manages database updates.

Partitions can be allocated in the collection data tables (e.g., on a per-month, per-year, or other basis). In one implementation, for example, all data in a given table, of a given month, is stored within a single partition. This allows data aging to be performed by dropping the partition containing the data for the month to be aged out. However, in one implementation, partitions are explicitly created before inserting data into a given month. In this implementation, for example, partitions are created, such as by an archiver checking and creating the partition needed for subsequent month(s) at the same time that it is checking to expire obsolete data.

Database replication can be provided for redundancy as well as to boost query performance and lessen the impact of data backups. In one embodiment, an active/passive, master/master arrangement is provided. In this embodiment, the arrangement allows a pair of servers to be configured nearly identically, and makes it simple to fail over to the second in case the first fails. Updates are sent to one server (the active server) but queries can be loaded-shared (e.g., by DB Loader 1512) across both servers as long as both servers are operating. In another embodiment, more than one slave can be used as well.

In one embodiment, manual failover is provided. In this embodiment, all database systems are monitored (e.g., by DB Monitor 1510), and if a shard becomes unreachable due to a failure, a manual procedure can be invoked to take the failed master offline, promote the passive replica to be the active master and restore system operation. Between the time the shard's master fails and when its role is failed-over to the replica, that shard will be unreachable for updates, although queries will not be affected as long as the passive server is operating. The parts of the system, other than the failed shard, will continue to operate normally in this condition. Specifically, database updates and queries affecting other shards are not impacted. When a failed node is repaired or replaced and returned to service, a procedure is implemented to re-synchronize the master and enable replication. In one implementation, the new server will become the passive peer.

In one particular embodiment, when only one active server is running for a given shard, that shard can be operated in a degraded state in which the following events or conditions are set in motion:

A ticket is opened for repair or replacement of the down machine;

Query traffic is focused on the operating server;

Backups are done from the operating server; when backups are running, update traffic is stopped on that server (analogous to replication being paused when backups are taken from a passive replica); and Archival processing is suspended.

Monitoring, such as by DB Monitor 1510, is also provided for (i) data being collected for the shards that is not mapped yet, (ii) shard data arriving to what appears to be the wrong database server; and (iii) the status of the active/passive databases and currency of replication of those databases. An alert can be issued when a failover needs to be invoked. A report can also be made for degraded status, and errors with respect to a passive replica (e.g., getting unexpectedly out of synch, replication errors, etc.) can be detected.

As described above, in one embodiment sharding is visible to the application, in the sense that the client will consult with a distributed service call to get the name of the database to connect to given the parameters of a query. Shard-to-node allocation metadata is stored in a collection specification table 1514; whole node-to-server metadata is stored in a host table 1516.

Still referring to the example configuration of FIG. 15, a module (e.g., Reduce2 filesystem running on a database server) can be used to pull data from one or more aggregator clusters 1108 (e.g., running Hadoop Distributed File System "HDFS") and effectuate storage onto the appropriate database server (or database server instance).

Figure 16:
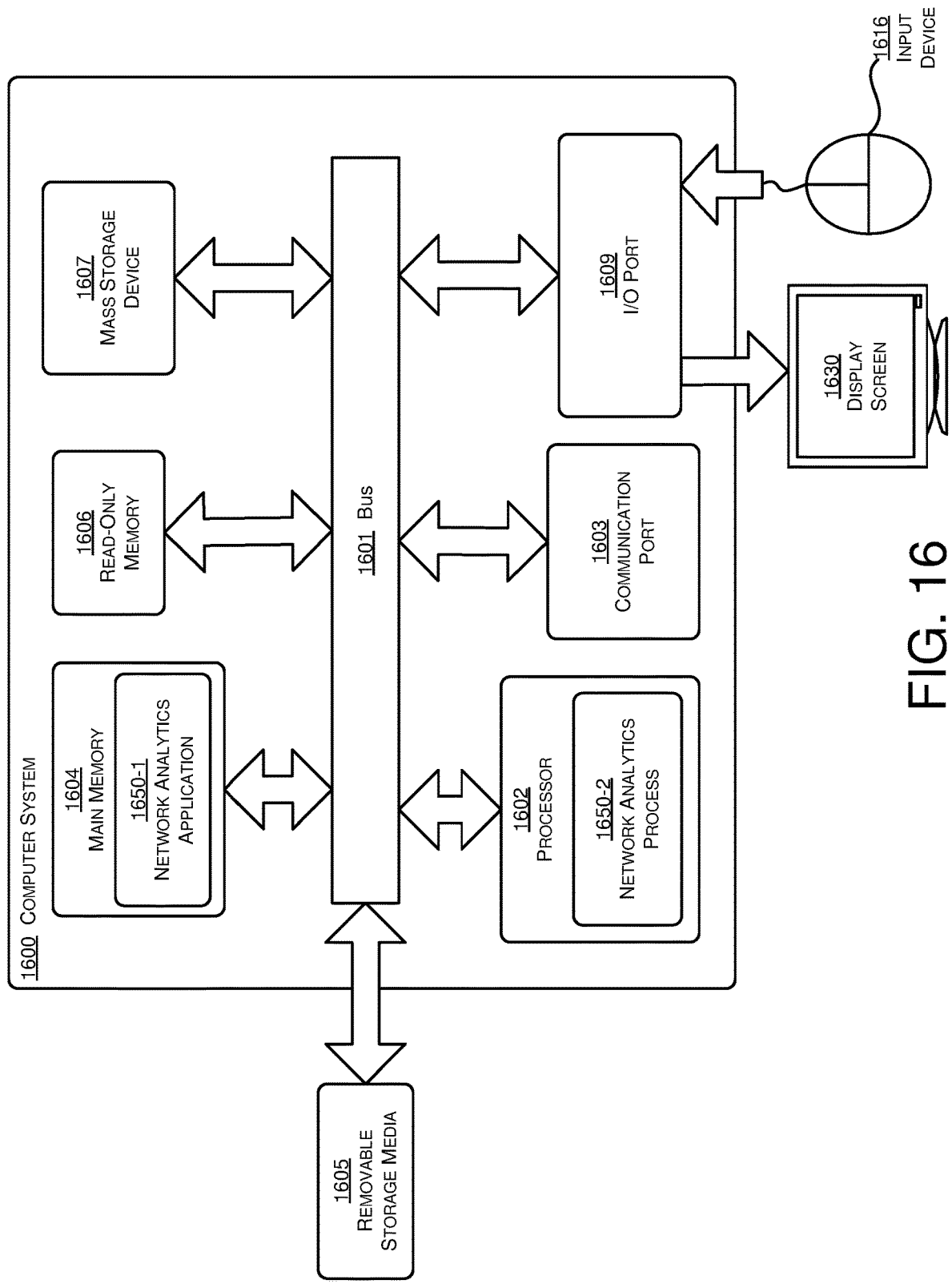
FIG. 16 illustrates an example block diagram of a computer system configured with a content analytics management system according to embodiments herein.

FIG. 16 is a schematic diagram of a computer system 1600 upon which embodiments of the present invention may be implemented and carried out. For example, one or more computing devices 1600 may be used to monitor and/or analyze content and/or network analytics (e.g., for streamed content within a content distribution network). Computer system 1600 generally exemplifies any number of computing devices, including general purpose computers (e.g., desktop, laptop or server computers) or specific purpose computers (e.g., embedded systems).

According to the present example, the computer system 1600 includes a bus 1601 (i.e., interconnect), at least one processor 1602, at least one communications port 1603, a main memory 1604, a removable storage media 1605, a read-only memory 1606, and a mass storage 1607. Processor(s) 1602 can be any known processor, such as, but not limited to, an Intel® Itanium® or Itanium 2® processor(s), AMD® Opteron® or Athlon MP® processor(s), or Motorola® lines of processors. Communications ports 1603 can be any of an RS-232 port for use with a modem based dial-up connection, a 10/100 Ethernet port, a Gigabit port using copper or fiber, or a USB port. Communications port(s) 1603 may be chosen depending on a network such as a Local Area Network (LAN), a Wide Area Network (WAN), or any network to which the computer system 1600 connects. The computer system 1600 may be in communication with peripheral devices (e.g., display screen 1630, input device 1616) via Input/Output (I/O) port 1609.

Main memory 1604 can be Random Access Memory (RAM), or any other dynamic storage device(s) commonly known in the art. Read-only memory 1606 can be any static storage device(s) such as Programmable Read-Only Memory (PROM) chips for storing static information such as instructions for processor 1602. Mass storage 1607 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 1601 communicatively couples processor(s) 1602 with the other memory, storage and communications blocks. Bus 1601 can be a PCI/PCI-X, SCSI, or Universal Serial Bus (USB) based system bus (or other) depending on the storage devices used. Removable storage media 1605 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 1604 is encoded with network analytics application 1650-1 that supports functionality as discussed herein. Network analytics application 1650-1 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 1602 accesses main memory 1604 via the use of bus 1601 in order to launch, run, execute, interpret or otherwise perform the logic instructions of the network analytics application 1650-1. Execution of network analytics application 1650-1 produces processing functionality in network analytics process 1650-2. In other words, the network analytics process 1650-2 represents one or more portions of the network analytics application 1650-1 performing within or upon the processor(s) 1602 in the computer system 1600.

It should be noted that, in addition to the network analytics process 1650-2 that carries out operations as discussed herein, other embodiments herein include the network analytics application 1650-1 itself (i.e., the un-executed or non-performing logic instructions and/or data). The network analytics application 1650-1 may be stored on a computer readable medium (e.g., a repository) such as a floppy disk, hard disk or in an optical medium. According to other embodiments, the network analytics application 1650-1 can also be stored in a memory type system such as in firmware, read only memory (ROM), or, as in this example, as executable code within the main memory 1604 (e.g., within Random Access Memory or RAM). For example, network analytics application 1650-1 may also be stored in removable storage media 1605, read-only memory 1606, and/or mass storage device 1607.

Example functionality supported by computer system 1600 and, more particularly, functionality associated with network analytics application 1650-1 and network analytics process 1650-2 is discussed above with reference to FIGS. 1-15.

In addition to these embodiments, it should also be noted that other embodiments herein include the execution of the content and/or network analytics application 1650-1 in processor(s) 1602 as the content and/or network analytics process 1650-2. Thus, those skilled in the art will understand that the computer system 1600 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

The embodiments described herein are implemented as logical steps in one or more computer systems. The logical operations invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

Various modifications and additions can be made to the example embodiments discussed herein without departing from the scope of the present invention. For example, while the embodiments described above refer to particular features, the scope of this application also includes embodiments having different combinations of features and embodiments that do not include all of the described features. Accordingly, the scope of the present application is intended to embrace all such alternatives, modifications, and variations together with all equivalents thereof.

What is claimed is:

1. A method comprising:
   extracting, at an edge site of a content delivery network (CDN), data from a plurality of requests for content from the CDN;
   collecting, by a collector disposed at the edge site, analytics associated with the extracted data based on a collection policy;
   instantiating one or more additional collectors in response to detecting an increase in recordable events in the CDN;
   aggregating the analytics collected at the edge site with analytics collected at at least one other edge site of the CDN; and
   in a database, storing the aggregated analytics according to a configurable data model.

2. The method as recited in claim 1, further comprising:
   filtering the collected analytics according to a data collection policy.

3. The method as recited in claim 1, wherein the analytics are stored in batches.

4. The method as recited in claim 3, wherein the batches comprise bins.

5. The method as recited in claim 4, wherein the bins comprise time bins.

6. The method as recited in claim 4, wherein the aggregated analytics comprise the batches aggregated into data sets corresponding to a plurality of bins.

7. The method as recited in claim 1, further comprising:
   discarding at least a portion of the collected analytics according to a data retention policy.

8. The method as recited in claim 7, wherein the collected analytics are discarded based on an age of the collected analytics according to the data retention policy.

9. The method as recited in claim 1, wherein the database comprises a database cluster administered by a database management system.

10. The method as recited in claim 1, further comprising:
    enabling a customer of the CDN to configure the configurable data model for storing aggregated analytics associated with requests for content of the customer.

11. The method as recited in claim 10, further comprising:
    enabling a second customer of the CDN to configure a second data model for storing aggregated analytics associated with requests for content of the second customer.

12. The method as recited in claim 10, wherein the customer of the CDN is enabled to configure a data model based on a service level.

13. A system comprising:
    a plurality of edge servers disposed in an edge site of a content delivery network (CDN);
    at least one collector disposed in the edge site and operable to collect according to a collection policy, analytics associated with requests for content in the CDN, each of the at least one collector module being associated with at least one of the plurality of edge servers,
    wherein one or more additional collectors are capable of being instantiated in response to an increase in recordable events in the CDN;
    an aggregator operable to aggregate the analytics collected at the edge site with analytics collected at at least one other edge site of the CDN; and
    a data store operable to store the aggregated analytics according to a configurable data model.

14. The system as recited in claim 13, wherein the at least one collector is operable to filter the collected analytics according to a data collection policy.

15. The system as recited in claim 13, wherein the at least one collector is operable to store the collected analytics from the plurality of edge servers in batches.

16. The system as recited in claim 15, wherein the batches comprise bins.

17. The system as recited in claim 16, wherein the bins comprise time bins.

18. The system as recited in claim 13, wherein the at least one collector is operable to discard at least a portion of the collected analytics based on a data retention policy.

19. The system as recited in claim 13, wherein the aggregator is operable to discard at least a portion of the collected analytics according to a data retention policy.

20. A non-transitory computer-readable medium storing instructions thereon for operation by a computer program to perform operations comprising:
- collecting, by a collector disposed at an edge site of a content delivery network (CDN), analytics associated with requests for content in the CDN according to a collection policy;
- aggregating the analytics collected at the edge site with analytics collected at at least one other edge site of the CDN;
- storing the aggregated analytics according to a configurable data model; and
- enabling a customer of the CDN to configure the configurable data model for storing aggregated analytics associated with requests for content of the customer.

* * * * *